US008494667B2

(12) United States Patent
Pang et al.

(10) Patent No.: US 8,494,667 B2
(45) Date of Patent: Jul. 23, 2013

(54) APPARATUS FOR ENCODING AND DECODING AUDIO SIGNAL AND METHOD THEREOF

(75) Inventors: Hee-Suk Pang, Seoul (KR); Hyen O Oh, Goyang-si (KR); Dong Soo Kim, Seoul (KR); Jae Hyun Lim, Seoul (KR); Yang Won Jung, Seoul (KR); Sung Young Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 1083 days.

(21) Appl. No.: 11/994,315

(22) PCT Filed: Jun. 30, 2006

(86) PCT No.: PCT/KR2006/002575
§ 371 (c)(1),
(2), (4) Date: Dec. 28, 2007

(87) PCT Pub. No.: WO2007/004828

PCT Pub. Date: Jan. 11, 2007

(65) Prior Publication Data

US 2008/0212803 A1 Sep. 4, 2008

Related U.S. Application Data

(60) Provisional application No. 60/695,007, filed on Jun. 30, 2005, provisional application No. 60/695,858, (Continued)

(30) Foreign Application Priority Data

| | | |
|---|---|---|
| Jan. 13, 2006 | (KR) | 10-2006-0004055 |
| Jan. 13, 2006 | (KR) | 10-2006-0004056 |
| Jan. 13, 2006 | (KR) | 10-2006-0004065 |
| Apr. 4, 2006 | (KR) | 10-2006-0030653 |
| Apr. 4, 2006 | (KR) | 10-2006-0030671 |
| Jun. 22, 2006 | (KR) | 10-2006-0056480 |
| Jun. 24, 2006 | (KR) | 10-2006-0058142 |
| Jun. 27, 2006 | (KR) | 10-2006-0058120 |
| Jun. 27, 2006 | (KR) | 10-2006-0058139 |
| Jun. 27, 2006 | (KR) | 10-2006-0058140 |
| Jun. 27, 2006 | (KR) | 10-2006-0058141 |

(51) Int. Cl.
*G06F 17/00* (2006.01)

(52) U.S. Cl.
USPC .......... 700/94

(58) Field of Classification Search
USPC .......... 700/94; 381/119; 369/1-12
See application file for complete search history.

(56) References Cited

U.S. PATENT DOCUMENTS 5,243,686 A 9/1993 Tokuda et al.
5,515,296 A 5/1996 Agarwal (Continued)

FOREIGN PATENT DOCUMENTS

AU 2006266655 8/2009
CN 1655651 A 8/2005

(Continued)

OTHER PUBLICATIONS

Quackenbush et al., "Noiseless Coding of Quantized Spectral Components in MPEG-2 Advanced Audio Coding", pp. 1-4, XP010248193, ISBN: 978-0-7803-3908-8.

(Continued)

*Primary Examiner* — Andrew C Flanders
(74) *Attorney, Agent, or Firm* — Birch, Stewart, Kolasch & Birch, LLP

(57) ABSTRACT

A method and/or apparatus for encoding and/or decoding an audio signal is disclosed, in which a downmix gain is applied to a downmix signal in an encoding apparatus which, in turn, transmits, to a decoding apparatus, a bit stream containing information as to the applied downmix gain. The decoding apparatus recovers the downmix signal, using the downmix gain information. A method and/or apparatus for encoding and/or decoding an audio signal is also disclosed, in which the encoding apparatus can apply an arbitrary downmix gain (ADG) to the downmix signal, and can transmit a bit stream containing information as to the applied ADG to the decoding apparatus. The decoding apparatus recovers the downmix signal, using the ADG information. A method and/or apparatus for encoding and/or decoding an audio signal is also disclosed, in which the method and/or apparatus can also vary the energy level of a specific channel, and can recover the varied energy level.

10 Claims, 24 Drawing Sheets

Related U.S. Application Data filed on Jul. 5, 2005, provisional application No. 60/748,608, filed on Dec. 9, 2005, provisional application No. 60/757,004, filed on Jan. 9, 2006, provisional application No. 60/758,236, filed on Jan. 12, 2006, provisional application No. 60/758,609, filed on Jan. 13, 2006, provisional application No. 60/759,623, filed on Jan. 18, 2006, provisional application No. 60/760,359, filed on Jan. 20, 2006, provisional application No. 60/778,070, filed on Mar. 2, 2006.

(56) References Cited

U.S. PATENT DOCUMENTS

| | | | | |
|---|---|---|---|---|
| 5,528,628 | A | 6/1996 | Park et al. | |
| 5,530,750 | A | 6/1996 | Akagiri | |
| 5,563,661 | A | 10/1996 | Takahashi et al. | |
| 5,579,430 | A | 11/1996 | Grill et al. | |
| 5,687,157 | A | 11/1997 | Imai et al. | |
| 5,890,125 | A | 3/1999 | Davis et al. | |
| 5,893,066 | A | 4/1999 | Hong | |
| 5,945,930 | A | 8/1999 | Kajiwara | |
| 5,966,688 | A | 10/1999 | Nandkumar et al. | |
| 6,047,027 | A | 4/2000 | Miyagosi et al. | |
| 6,125,398 | A | 9/2000 | Mirashrafi et al. | |
| 6,131,084 | A | 10/2000 | Hardwick | |
| 6,148,283 | A | 11/2000 | Das | |
| 6,295,319 | B1 | 9/2001 | Sueyoshi et al. | |
| 6,309,424 | B1 | 10/2001 | Fallon | |
| 6,356,639 | B1 | 3/2002 | Ishito et al. | |
| 6,399,760 | B1 | 6/2002 | Gimeno et al. | |
| 6,421,467 | B1 | 7/2002 | Mitra | |
| 6,442,110 | B1 | 8/2002 | Yamamoto et al. | |
| 6,453,120 | B1 | 9/2002 | Takahashi et al. | |
| 6,456,966 | B1 | 9/2002 | Iwabuchi | |
| 6,560,404 | B1 | 5/2003 | Okada et al. | |
| 6,580,671 | B1 * | 6/2003 | Otomo et al. | 369/47.15 |
| 6,636,830 | B1 | 10/2003 | Princen et al. | |
| 7,376,555 | B2 | 5/2008 | Schuijers et al. | |
| 7,394,903 | B2 * | 7/2008 | Herre et al. | 381/23 |
| 7,505,825 | B2 * | 3/2009 | Wilson et al. | 700/94 |
| 7,519,538 | B2 | 4/2009 | Villemoes et al. | |
| 7,606,627 | B2 * | 10/2009 | Wilson et al. | 700/94 |
| 7,783,050 | B2 * | 8/2010 | Oh et al. | 381/22 |
| 7,853,343 | B2 * | 12/2010 | Omata | 700/94 |
| 2001/0055302 | A1 | 12/2001 | Taylor et al. | |
| 2002/0049586 | A1 | 4/2002 | Nishio et al. | |
| 2002/0106019 | A1 | 8/2002 | Chaddha et al. | |
| 2002/0128829 | A1 | 9/2002 | Yamaura et al. | |
| 2003/0219130 | A1 | 11/2003 | Baumgarte et al. | |
| 2004/0049379 | A1 | 3/2004 | Thumpudi et al. | |
| 2004/0057523 | A1 | 3/2004 | Koto et al. | |
| 2004/0138895 | A1 | 7/2004 | Lokhoff et al. | |
| 2004/0186735 | A1 | 9/2004 | Ferris et al. | |
| 2004/0199276 | A1 | 10/2004 | Poon | |
| 2004/0247035 | A1 | 12/2004 | Schroder et al. | |
| 2005/0053242 | A1 * | 3/2005 | Henn et al. | 381/22 |
| 2005/0058304 | A1 | 3/2005 | Baumgarte et al. | |
| 2005/0114126 | A1 | 5/2005 | Geiger et al. | |
| 2005/0157883 | A1 | 7/2005 | Herre et al. | |
| 2005/0174269 | A1 | 8/2005 | Sherigar et al. | |
| 2005/0180579 | A1 | 8/2005 | Baumgarte et al. | |
| 2005/0276420 | A1 | 12/2005 | Davis | |
| 2006/0023577 | A1 | 2/2006 | Shinoda et al. | |
| 2006/0085200 | A1 | 4/2006 | Allamanche et al. | |
| 2006/0165237 | A1 | 7/2006 | Villemoes et al. | |
| 2006/0190247 | A1 | 8/2006 | Lindblom | |
| 2006/0239473 | A1 | 10/2006 | Kjorling et al. | |
| 2007/0038439 | A1 | 2/2007 | Schuijers et al. | |
| 2007/0150267 | A1 | 6/2007 | Honma et al. | |
| 2009/0185751 | A1 | 7/2009 | Kudo et al. | |

FOREIGN PATENT DOCUMENTS

| | | | |
|---|---|---|---|
| DE | 697 12 383 | T2 | 1/2003 |
| EP | 0 610 975 | A2 | 8/1994 |
| EP | 0867867 | A2 | 9/1998 |
| EP | 0943143 | A1 | 9/1999 |
| EP | 1001549 | A2 | 5/2000 |
| EP | 1047198 | A2 | 10/2000 |
| EP | 1869774 | A0 | 12/2007 |
| EP | 1905005 | A0 | 4/2008 |
| JP | 2002-33523 | A | 11/2002 |
| JP | 2003-233395 | A | 8/2003 |
| JP | 2004-220743 | A | 8/2004 |
| JP | 2005-63655 | A | 3/2005 |
| JP | 2005-332449 | A | 12/2005 |
| JP | 2006-120247 | A | 5/2006 |
| RU | 2158970 | C2 | 11/2000 |
| RU | 2214048 | C2 | 10/2003 |
| RU | 2221329 | C2 | 1/2004 |
| RU | 2005103637 | A | 7/2005 |
| TW | 204406 | | 4/1993 |
| TW | 289885 | | 11/1996 |
| TW | 317064 | | 10/1997 |
| TW | 360860 | | 6/1999 |
| TW | 378478 | | 1/2000 |
| TW | 384618 | B | 3/2000 |
| TW | 405328 | B | 9/2000 |
| TW | 550541 | B | 9/2003 |
| TW | 567466 | B | 12/2003 |
| TW | 569550 | B | 1/2004 |
| TW | 200404222 | | 3/2004 |
| TW | 200405673 | | 4/2004 |
| TW | M257575 | | 2/2005 |
| TW | I230530 | | 4/2005 |
| WO | WO-95/27337 | A1 | 10/1995 |
| WO | WO-1999/18569 | A1 | 4/1999 |
| WO | WO-99/56470 | A1 | 11/1999 |
| WO | WO-03/046889 | A1 | 6/2003 |
| WO | WO-03/088212 | A1 | 10/2003 |
| WO | WO-2004/008805 | A1 | 1/2004 |
| WO | WO-2004/072956 | A1 | 8/2004 |
| WO | WO-2004/080125 | A1 | 9/2004 |
| WO | WO-2004/093495 | A1 | 10/2004 |
| WO | WO-2005/043511 | A1 | 5/2005 |
| WO | WO-2006/048226 | A1 | 5/2006 |
| WO | WO-2006/108464 | A1 | 10/2006 |
| WO | 2007/004828 | | 1/2007 |
| WO | WO-2007/01115 | A1 | 1/2007 |

OTHER PUBLICATIONS

Oh et al., Proposed Core Experiment on Pilot-based Coding of Spatial Parameters for MPEG Surround. Oct. 13, 2005, XP030041219.

"Text of Second Working Draft for MPEG Surround" ISO/IEC JTC 1/SC 29/WG 11, No. N7387, Jul. 25, 2005, XP030013965.

Pang, Hee-Suk, "Clipping Prevention Scheme for MPEG Surround", ETRI Journal, Aug. 2008, vol. 30, No. 4, pp. 606-608, XP-002528179.

Herre, Jurgen, et al., "Overview of MPEG-4 Audio and its Applications in Mobile Communications", IEEE, 2000, pp. 604-613.

Oh et al.: "Proposed changes in MPEG-4 BSAC multi-channel audio coding" ISO/IEC JTC/SC29/WG11 MPEG2004/M11018, Jul. 19, 2004, pp. 1-7, XP002384450.

Tewfik et al.: "Enhanced Wavelet Based Audio Coder", Nov. 1, 1993, pp. 896-900, XP010801441.

Ehrer et al.: "Audio Coding Technology of ExAC" Oct. 20, 2004, pp. 290-293, XP010801441.

Schuller et al.: "Perceptual Audio Coding Using Adaptive Pre-and Post-Filters and Lossless Compression" IEEE Transactions on Speech and Audio Processing, New York, vol. 10, No. 6, Sep. 1, 2002, XP011079662, pp. 379-390.

Bosi et al.: "ISO/IEC MPEG-2 Advanced Audio Coding" Journal of the Audio Engineering Society, New York, vol. 45, No. 10, Oct. 1, 1997, pp. 789-812, XP000730161.

Moon et al., "A multi-channel audio compression method with virtual source location information for MPEG-4 SAC". vol. 51, Issue 4, Nov. 2005, pp. 1253-1259.

Faller C, "Coding of spatial audio compatible with different playback formats". Audio Engineering Society Convention Paper, New York, NY, US. Oct. 28, 2004, pp. 1-12.
Jin C et al., Individualization in spatial-audio coding. Applications of Signal Processing to Audio and Acoustics, 2003 IEEE Workshop. Oct. 19-22, 2003 pp. 213-216.
Audio Subgroup, ITU Study Group 16, "Text of Working Draft for Spatial Audio Coding (SAC)," International Organization for Standardization Organisation Internationale Normalisation, Apr. 2005, Busan, Korea, pp. 1-132, XP-03003794.
Baumgarte, F. et al., "Audio Coder Enhancement using Scalable Binaural Coding with Equalized Mixing", Audio Engineering Society, Convention Paper 6060, Presented at the 116th Convention, May 8-11, 2004, Berlin, Germany, XP40506808.
Herre, J. et al., "The Reference Model Architecture for MPEG Spatial Audio Coding", Audio Engineering Society, Convention Paper 6447, Presented at the 118th Convention, May 28-31, 2005, Barcelona, Spain, XP40507255.

* cited by examiner (a)

FIG. 10A

Table 1..

| index | Surround gain | LFE gain | Downmix gain |
|---|---|---|---|
| 0 | 1/sqrt(2) | 1/sqrt(10) | 1 |
| 1 | 1/sqrt(2) | 1/sqrt(10) | 1/2 |
| 2..15 | Reserved | reserved | reserved |

Table 2..

| index | Surround gain | LFE gain | Downmix gain |
|---|---|---|---|
| 0 | 1/sqrt(2) | 1/sqrt(10) | 1 |
| 1 | 1/sqrt(2) | 1/sqrt(10) | 1/2 |
| 2 | 1/sqrt(2) | 1/sqrt(10) | 1/4 |
| 3..15 | Reserved | reserved | reserved |

Table 3..

| index | Surround gain | LFE gain | Downmix gain |
|---|---|---|---|
| 0 | 1/sqrt(2) | 1/sqrt(10) | 1 |
| 1 | 1/sqrt(2) | 1/sqrt(10) | 1/sqrt(2) |
| 2<br>3..15 | 1/sqrt(2)<br>Reserved | 1/sqrt(10)<br>reserved | 1/2<br>reserved |

FIG. 10B

Table 4..

| index | Surround gain | LFE gain | Downmix gain |
|---|---|---|---|
| 0 | 1/sqrt(2) | 1/sqrt(10) | 1 |
| 1 | 1/sqrt(2) | 1/sqrt(10) | 1/sqrt(2) |
| 2 | 1/sqrt(2) | 1/sqrt(10) | 1/2 |
| 3 | 1/sqrt(2) | 1/sqrt(10) | 1/(2xsqrt(2)) |
| 4 | 1/sqrt(2) | 1/sqrt(10) | 1/4 |
| 5..15 | Reserved | reserved | reserved |

Table 5..

| index | Surround gain | LFE gain | Downmix gain |
|---|---|---|---|
| 0 | 1/sqrt(2) | 1/sqrt(10) | 1 |
| 1 | 1/sqrt(2) | 1/sqrt(10) | 3/4 |
| 2 | 1/sqrt(2) | 1/sqrt(10) | 2/3 |
| 3 | 1/sqrt(2) | 1/sqrt(10) | 1/2 |
| 4..15 | Reserved | reserved | reserved |

Table 6..

| index | Surround gain | LFE gain | Downmix gain |
|---|---|---|---|
| 0 | 1/sqrt(2) | 1/sqrt(10) | 1 |
| 1 | 1/sqrt(2) | 1/sqrt(10) | 3/4 |
| 2 | 1/sqrt(2) | 1/sqrt(10) | 2/4 |
| 3 | 1/sqrt(2) | 1/sqrt(10) | 1/4 |
| 4..15 | Reserved | reserved | reserved |

FIG. 18

| bsFreqResStridexxx | pbStride |
|---|---|
| 0 | 1(i.e., no grouping) |
| 1 | 2 |
| 2 | 5 |
| 3 | 28(or number) |

APPARATUS FOR ENCODING AND DECODING AUDIO SIGNAL AND METHOD THEREOF

TECHNICAL FIELD

The present invention relates to a method and/or an apparatus for encoding and/or decoding an audio signal.

BACKGROUND ART

The present invention relates to encoding and/or decoding of spatial information of a multi-channel audio signal. Recently, various coding techniques and methods for digital audio signals have been developed, and various products associated therewith have also been produced.

However, when a multi-channel audio signal is downmixed in the form of a mono or stereo audio signal, there may be a problem of sound level loss of the audio signal. In particular, a coded signal still exhibits a sound level loss phenomenon even after core codec encoding thereof because the coded signal has a limited size, for example, 16 bits. Such a sound level loss phenomenon of the audio signal affects the output characteristics of the audio signal, and causes a degradation in sound quality.

DISCLOSURE OF INVENTION

An object of the present invention devised to solve the above-mentioned problems lies in solving a sound level loss problem of a multi-channel audio signal by applying a downmix gain to a downmix signal of the multi-channel audio signal.

Another object of the present invention is to solve a sound level loss problem of a multi-channel audio signal by applying an arbitrary downmix gain to a downmix signal of the multi-channel audio signal.

Another object of the present invention is to solve a sound level loss problem of a multi-channel audio signal by applying a specific channel gain to a specific channel of the multi-channel audio signal.

Another object of the present invention is to solve a sound level loss problem of a multi-channel audio signal by using at least two of a downmix gain, an arbitrary downmix gain and a specific channel gain.

To achieve these and other advantages and in accordance with the purpose of the present invention, a method of decoding an audio signal according to the present invention includes the steps of: separating a downmix signal from a bitstream of the audio signal; and applying a downmix gain to the downmix signal, to modify the downmix signal.

To further achieve these and other advantages and in accordance with the purpose of the present invention, a method for decoding an audio signal according to the present invention includes the steps of: separating a downmix signal and a spatial information signal from a bitstream of the audio signal; transforming the downmix signal to a multi-channel audio signal, using the spatial information signal; and applying a downmix gain to the multi-channel audio signal.

To further achieve these and other advantages and in accordance with the purpose of the present invention, a method for encoding an audio signal according to the present invention includes the steps of: generating a downmix signal and a spatial information signal from a multi-channel audio signal; and applying a downmix gain to the downmix signal.

To further achieve these and other advantages and in accordance with the purpose of the present invention, a method for encoding an audio signal according to the present invention includes the steps of: applying a downmix gain to a multi-channel audio signal; and generating a downmix signal from the downmix gain-applied multi-channel audio signal.

To further achieve these and other advantages and in accordance with the purpose of the present invention, an apparatus for decoding an audio signal according to the present invention includes: a demultiplexer separating a downmix signal and a spatial information signal from a bitstream of an audio signal; a downmix gain applying unit applying a downmix gain to the downmix signal; and a multi-channel generating unit transforming the downmix gain-applied downmix signal to a multi-channel audio signal, using the spatial information signal.

To further achieve these and other advantages and in accordance with the purpose of the present invention, an apparatus for encoding an audio signal according to the present invention includes: a downmixing unit generating a downmix signal from a multi-channel audio signal; a spatial information generating unit extracting spatial information from the multi-channel audio signal; and a downmix gain applying unit applying a downmix gain to the downmix signal.

BRIEF DESCRIPTION OF DRAWINGS

The accompanying drawings, which are included to provide a further understanding of the invention, illustrate embodiments of the invention and together with the description serve to explain the principle of the invention.

In the drawings:

FIGS. 10A and 10B are tables illustrating various types of the downmix gain according to an embodiment of the present invention;

FIG. 18 is a table illustrating a plurality of frequency bands to which an ADG is applied in accordance with an embodiment of the present invention;

BEST MODE FOR CARRYING OUT THE INVENTION

Reference will now be made in detail to the preferred embodiments of the present invention, examples of which are illustrated in the accompanying drawings.

Figure 1:
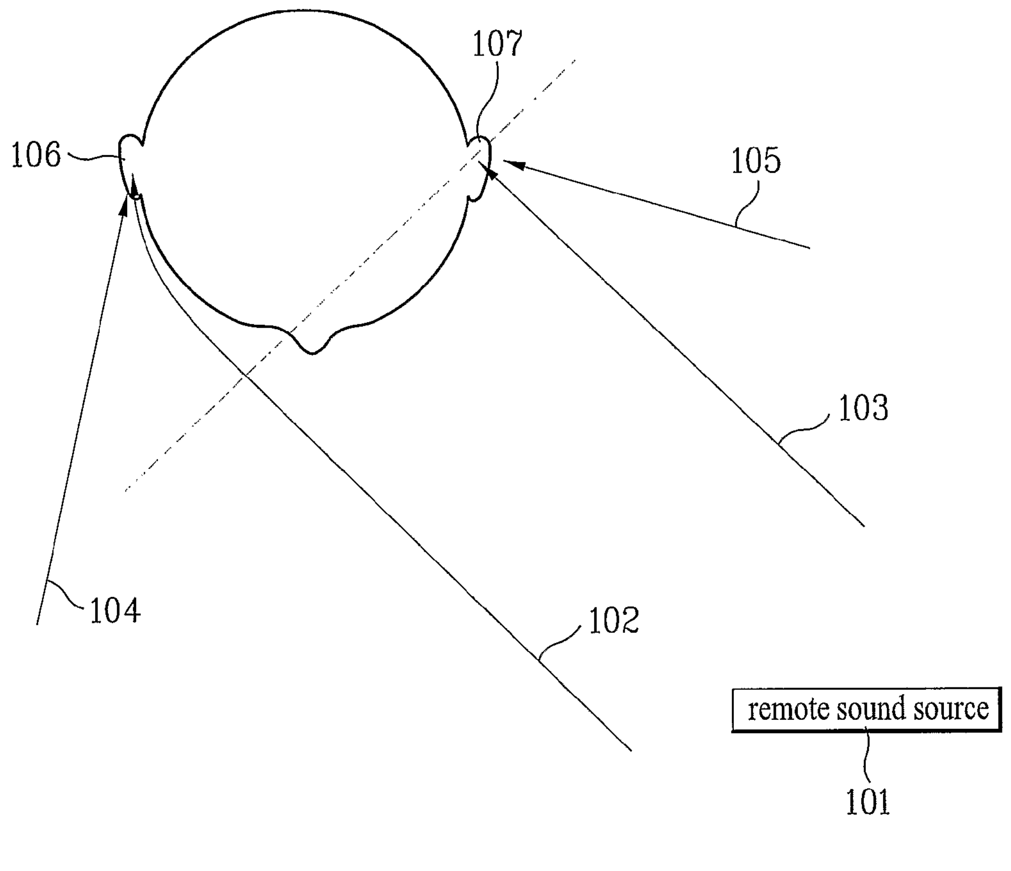
FIG. 1 is a schematic view illustrating a method for enabling a human being to recognize spatial information contained in an audio signal.

FIG. 1 illustrates a method for enabling a human being to recognize spatial information of an audio signal.

Coding of a multi-channel audio signal utilizes the fact that, since the human being three-dimensionally recognizes an audio signal, the audio signal can be expressed in the form of three-dimensional spatial information, using a plurality of parameter sets.

"Spatial parameters" for representing spatial information of a multi-channel audio signal include a channel level difference (CLD), an inter channel coherence (ICC), and a channel time difference (CTD). The CLD means an energy difference between two channels. The ICC means a correlation between two channels. The CTD means a time difference between two channels.

FIG. 1 illustrates how the human being spatially recognizes an audio signal, and how the concept of the spatial parameters is created.

Referring to FIG. 1, a direct sound wave 103 from a remote sound source 101 reaches the left ear 107 of the human being, and another direct sound wave 102 reaches the right ear 106 of the human being after being diffracted around the head of the human being.

The two sound waves 102 and 103 have differences in terms of arrival time and energy level. Due to such differences, CTD and CLD parameters as described above are created.

On the other hand, if reflected sound waves 104 and 105 reach both ears of the human being, or if the sound source 101 includes dispersed sound sources, sound waves having little correlation reach both ears of the human being. As a result, an ICC parameter as described above is created.

Using spatial parameters created in accordance with the above-described principle, it is possible to transmit a multi-channel audio signal in the form of a mono or stereo signal, and to output the transmitted mono or stereo signal in the form of multi-channel audio signal.

The present invention provides a method for modifying a downmix signal when the downmix signal is transformed to a multi-channel audio signal, using the above-described spatial information.

Figure 2:
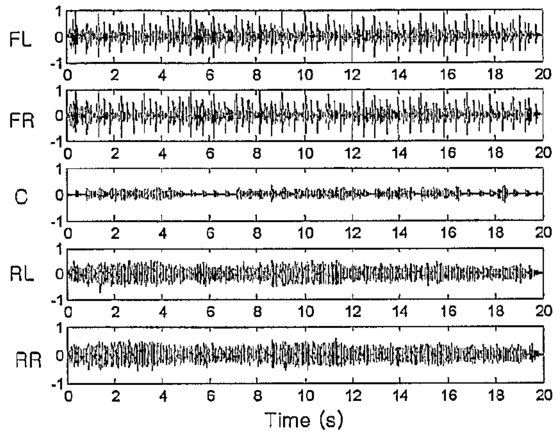
FIG. 2 is a waveform diagram illustrating a sound level loss phenomenon of an audio signal occurring in a process for encoding the audio signal.
Figure 2:
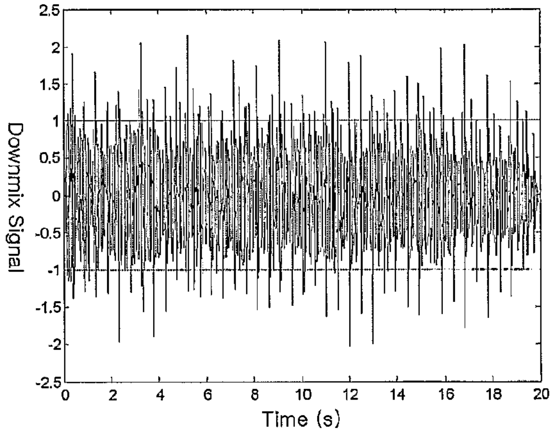
Figure 2:
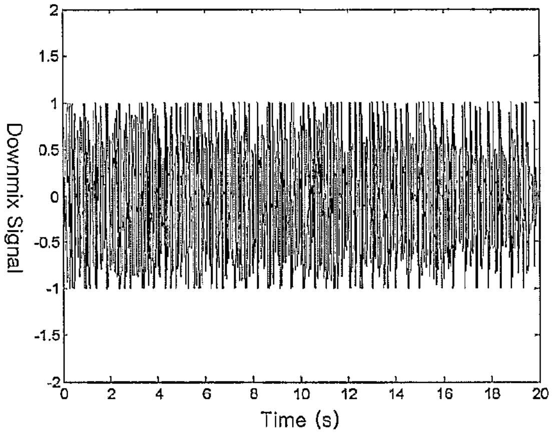

FIG. 2 depicts sound level loss of an audio signal generated during encoding of the audio signal. Sound level loss of an audio signal is mainly generated due to two factors. First, such sound level loss is generated when the sound level of an original signal is high. Second, such sound level loss is generated when the number of input channels to be downmixed is also large. For example, sound level loss is more frequently generated when 7 channels are downmixed to one channel, as compared to the case in which 3 channels are downmixed to one channel. The sound level loss of FIG. 2 corresponds to the case in which 5 channels are downmixed to one channel. However, the present invention is not limited to the illustrated case. Such sound level loss may be generated due to various factors, for example, clipping.

A drawing (a) of FIG. 2 depicts the sound level of an original signal composed of 5 channels. Each channel of the original signal may use almost the entire range of a limited size (for example, 16 bits). A drawing (b) of FIG. 2 depicts a downmix signal produced in accordance with downmixing of the 5 channels. As shown in a drawing (b) of FIG. 2, the downmix signal may have many peaks exceeding the limited size. A drawing (c) of FIG. 2 depicts an audio signal produced after encoding/decoding of the downmix signal carried out using a core codec (for example, an AAC codec). Even in the case of such an audio signal, which is produced in accordance with an encoding/decoding operation of a core codec, there still may be sound level loss because the audio signal is expressed within a limited size (for example, 16 bits). Such sound level loss affects the output characteristics of a multi-channel audio signal, and causes a degradation in sound quality.

Figure 3:
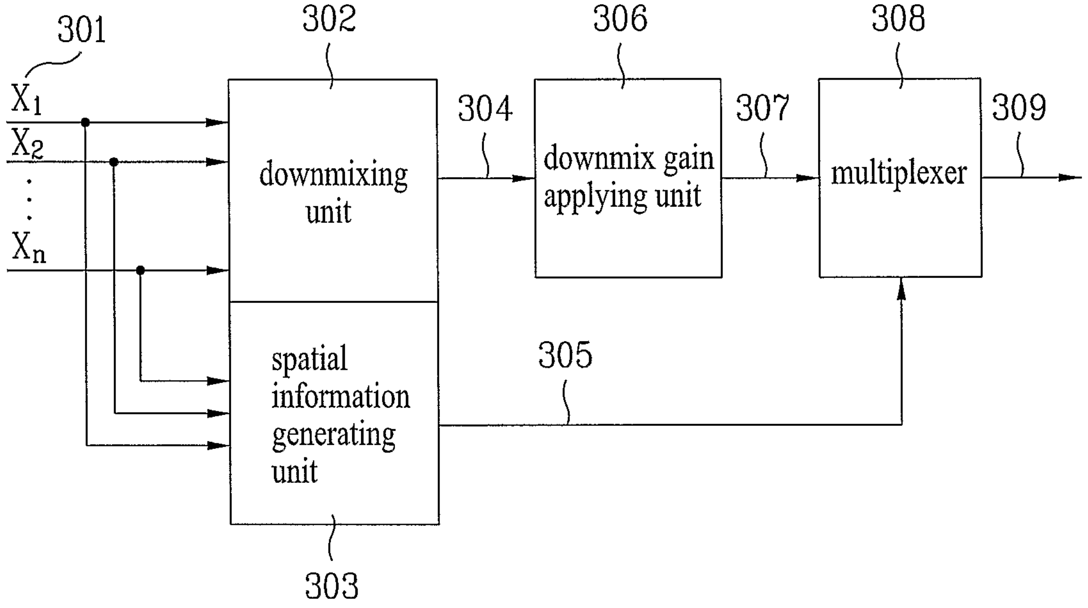
FIG. 3 is a block diagram illustrating a first encoding apparatus in which a downmix gain is applied to a downmix signal, for modification of the downmix signal, in accordance with an embodiment of the present invention.

FIG. 3 illustrates a first encoding apparatus in which a downmix gain is applied to a downmix signal, for modification of the downmix signal, in accordance with an embodiment of the present invention. The first encoding apparatus includes a downmixing unit 302, a spatial information generating unit 303, a downmix gain applying unit 306, and a multiplexer 308.

Referring to FIG. 3, the downmixing unit 302 downmixes a multi-channel audio signal 301, thereby generating a downmix signal 304. In FIG. 3, "n" means the number of input channels. The downmix signal 304 may be a mono, stereo, or multi-channel audio signal.

The spatial information generating unit 303 extracts spatial information from the multi-channel audio signal 301. Here, "spatial information" means information as to audio signal channels used in upmixing a downmix signal to a multi-channel audio signal, in which the downmix signal is generated by downmixing of the multi-channel audio signal.

The downmix gain applying unit 306 applies a downmix gain to the downmix signal 304, to reduce the sound level of the downmix signal 304. Here, "downmix gain" means a value applied (for example, multiplied) to the downmix signal or multi-channel audio signal, to vary the sound level of the signal. In encoding apparatuses, application of such a downmix gain to a downmix signal is mainly used to reduce the sound level of the downmix signal. For example, when a downmix gain larger than 1 is used, the downmix signal is multiplied by the reciprocal of the downmix gain, to reduce the overall sound level of the downmix signal.

A specific channel gain, for example, low frequency (LFE) gain or surround gain, may be applied to at least one channel of the multi-channel audio signal 301. The downmixing unit 302 may generate the downmix signal 304 associated with the multi-channel audio signal 301 under the condition in which a specific channel gain has been applied to at least one channel of the multi-channel audio signal 301, as described above. Thereafter, the application of the downmix gain to the downmix signal 304 is carried out. Of course, the downmix gain applying unit 306 may carry out the application of the downmix gain in the procedure of generating the downmix signal 304 from the multi-channel audio signal 301.

The multiplexer 308 generates a bitstream 309 including the downmix signal 307, to which the downmix gain has been applied, and a spatial information signal 305. The spatial information signal 305 is constituted by the spatial information extracted by the spatial information generating unit 303. The bitstream 309 is transmitted to a decoding apparatus. The bitstream 309 may also contain information as to the downmix gain, namely, downmix gain information.

Figure 4:
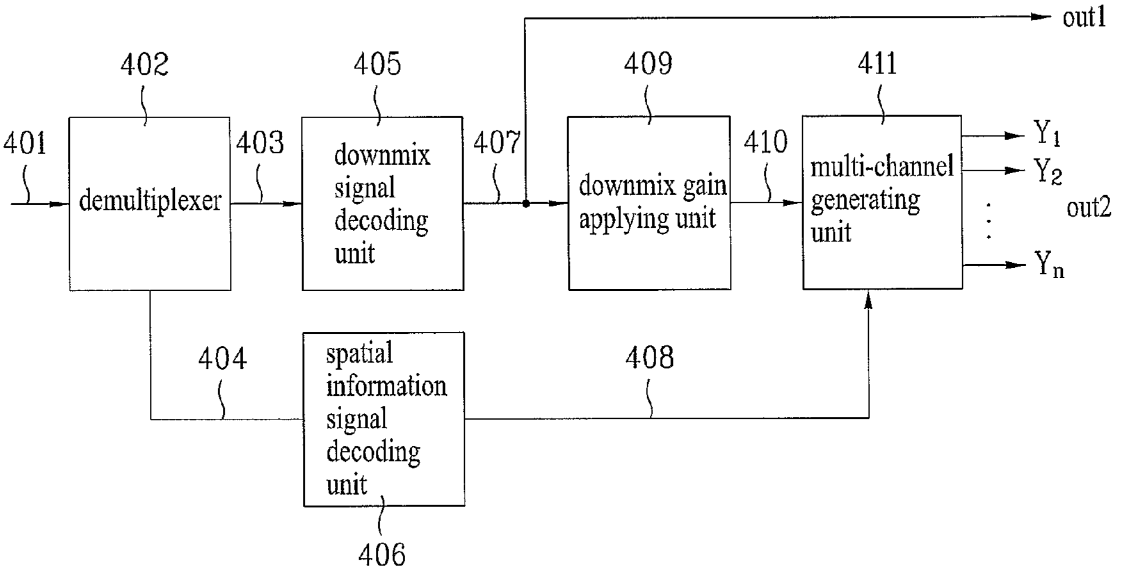
FIG. 4 is a block diagram illustrating a first decoding apparatus in which a downmix gain is applied to a downmix signal, for modification of the downmix signal, in accordance with an embodiment of the present invention.

FIG. 4 illustrates a first decoding apparatus in which a downmix gain is applied to a downmix signal, for modification of the downmix signal, in accordance with an embodiment of the present invention. The first decoding apparatus includes a demultiplexer 402, a downmix signal decoding unit 405, a spatial information signal decoding unit 406, a downmix gain applying unit 409, and a multi-channel generating unit 411.

Referring to FIG. 4, the demultiplexer 402 receives a bitstream 401 of an audio signal, and separates an encoded downmix signal 403 and an encoded spatial information signal 404 from the bitstream 401.

The downmix signal decoding unit 405 decodes the encoded downmix signal 403, and outputs the resulting decoded signal as a downmix signal 407. The spatial information signal decoding unit 406 decodes the encoded spatial information signal 404, and outputs the resulting decoded signal as spatial information 408.

The downmix gain applying unit 409 applies a downmix gain to the downmix signal 407, thereby outputting a downmix signal 410 having an original sound level. For example, when the downmix gain is larger than 1, the downmix signal is multiplied by the downmix gain, to increase the sound level of the downmix signal. Meanwhile, the downmix gain applying unit 409 executes the application of the downmix gain in the procedure of transforming the downmix signal to a multi-channel audio signal.

The multi-channel generating unit 411 outputs the downmix gain-applied downmix signal 410 as a multi-channel audio signal (out2), using the spatial information 408.

Figure 5:
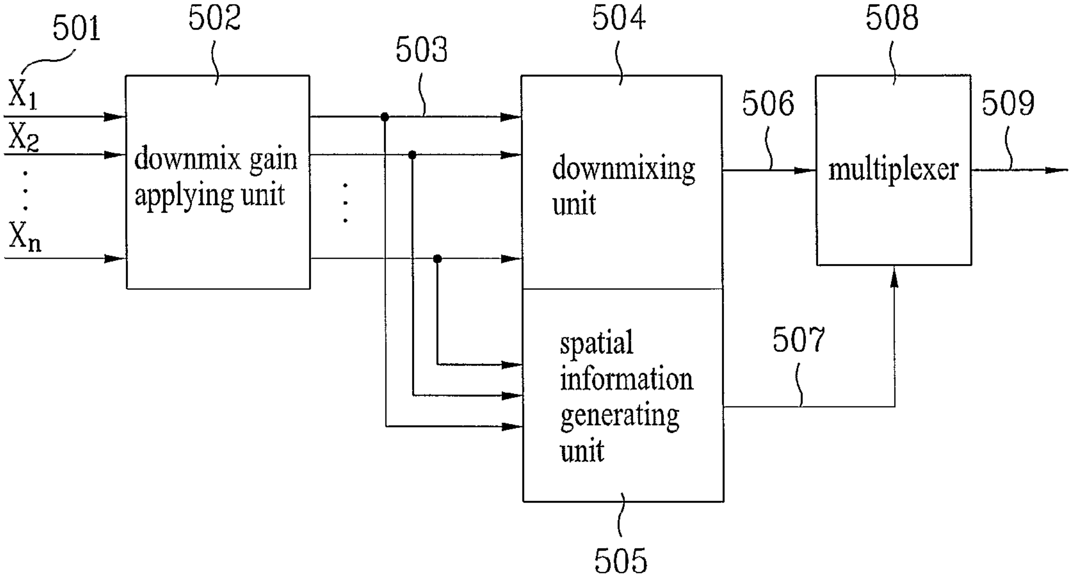
FIG. 5 is a block diagram illustrating a second encoding apparatus in which a downmix gain is applied to a multi-channel audio signal, for modification of the multi-channel audio signal, in accordance with an embodiment of the present invention.

FIG. 5 illustrates a second encoding apparatus in which a downmix gain is applied to a multi-channel audio signal, for modification of the multi-channel audio signal, in accordance with an embodiment of the present invention. Similarly to the first encoding apparatus, the second encoding apparatus includes a downmixing unit 504, a spatial information generating unit 505, a downmix gain applying unit 502, and a multiplexer 508.

Referring to FIG. 5, the second encoding apparatus is similar to the first encoding apparatus. The second encoding apparatus has a difference from the first encoding apparatus in terms of the position of the downmix gain applying unit 502. That is, although the downmix gain is applied to the downmix signal in the first encoding apparatus, the downmix gain is applied to the multi-channel audio signal in the second encoding apparatus.

In detail, the downmix gain applying unit 502 applies a downmix gain to a multi-channel audio signal 501, thereby generating a downmix gain-applied multi-channel audio signal 503. The downmixing unit 504 downmixes the multi-channel audio signal 503, thereby generating a downmix signal 506. The spatial information generating unit 505 extracts spatial information from the downmix gain-applied multi-channel audio signal 503. The multiplexer 508 generates a bitstream 509 including the downmix signal 506, and a spatial information signal 507.

Figure 6:
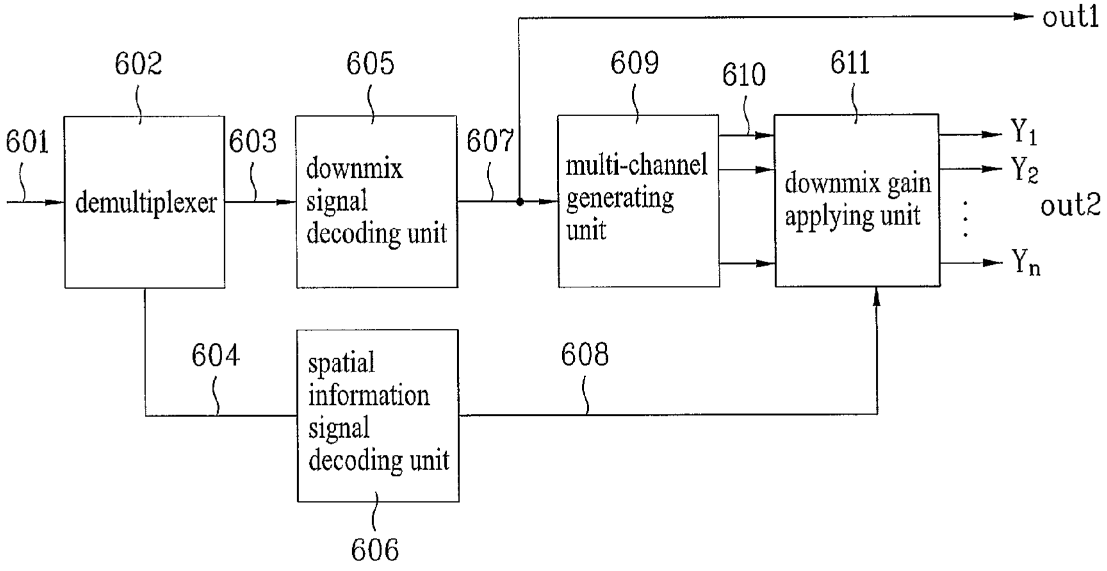
FIG. 6 is a block diagram illustrating a second decoding apparatus in which a downmix gain is applied to a multi-channel audio signal, for modification of the multi-channel audio signal, in accordance with an embodiment of the present invention.

FIG. 6 illustrates a second decoding apparatus in which a downmix gain is applied to a multi-channel audio signal, for modification of the multi-channel audio signal, in accordance with an embodiment of the present invention. Similarly to the first decoding apparatus, the second decoding apparatus includes a demultiplexer 602, a downmix signal decoding unit 605, a spatial information signal decoding unit 606, a multi-channel generating unit 609, and a downmix gain applying unit 611.

Since the demultiplexer 602, downmix signal decoding unit 605, and spatial information signal decoding unit 606 are identical or similar to those of the first decoding apparatus described with reference to FIG. 4, no detailed description thereof will be given.

The multi-channel generating unit 609 transforms a downmix signal 607 to a multi-channel audio signal 610, using spatial information 608.

The downmix gain applying unit 611 applies a downmix gain to the multi-channel audio signal 610, and thus, outputs a downmix gain-applied multi-channel audio signal (out2). When the decoding apparatus cannot output a multi-channel audio signal, using spatial information, the downmix signal 607 may be directly output from the downmix signal decoding unit 605 (out1).

Figure 7:
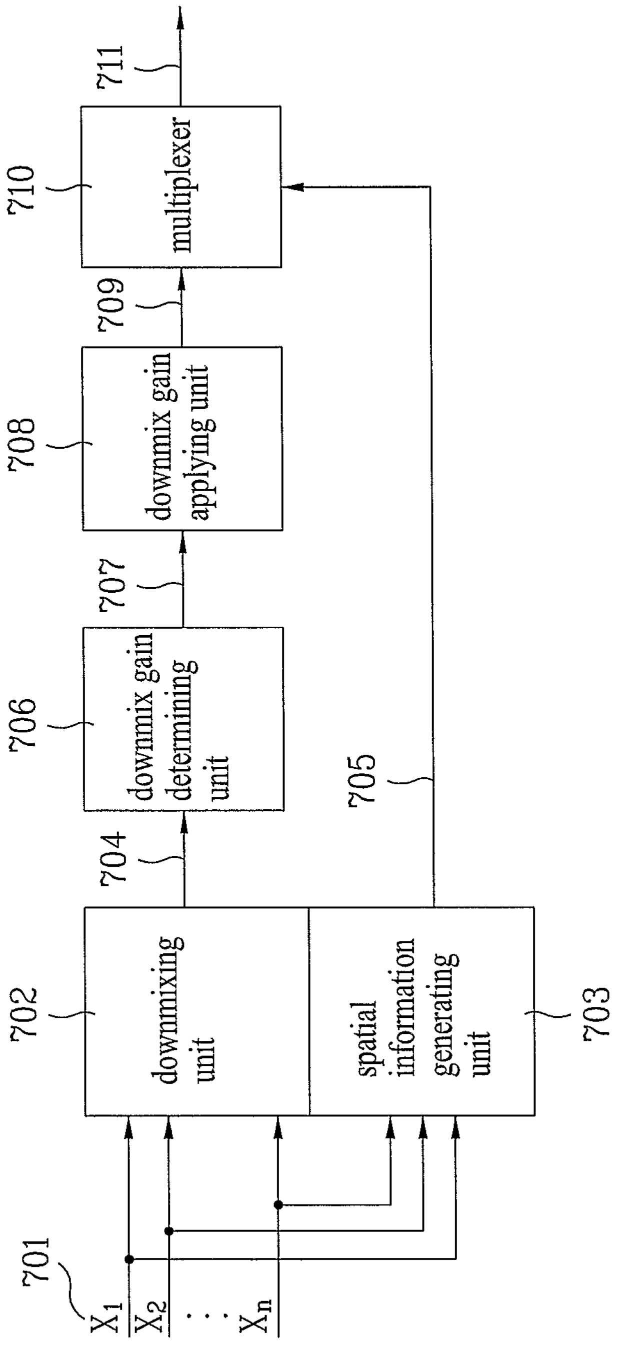
FIG. 7 is a block diagram illustrating a third encoding apparatus in which a downmix gain is applied to a downmix signal, for modification of the downmix signal, in accordance with an embodiment of the present invention.

FIG. 7 illustrates a third encoding apparatus in which a downmix gain is applied to a downmix signal, for modification of the downmix signal, in accordance with an embodiment of the present invention. The third encoding apparatus includes a downmixing unit 702, a spatial information generating unit 703, a downmix gain determining unit 706, a downmix gain applying unit 708, and a multiplexer 710.

Referring to FIG. 7, the third encoding apparatus is similar to the first encoding apparatus. The third encoding apparatus has a difference from the first encoding apparatus in that the third encoding apparatus includes the downmix gain determining unit 706. Since the downmixing unit 702, spatial information generating unit 703, downmix gain applying unit 708, and multiplexer 710 are identical or similar to those of the first encoding apparatus described with reference to FIG. 3, no detailed description thereof will be given.

The downmix gain determining unit 706 determines a downmix gain which will be applied to a downmix signal. The downmix gain determining unit 706 can determine the downmix gain by measuring at least one of the frequency and the degree of sound level loss generated when a multi-channel audio signal 701 is downmixed to generate a downmix signal 704.

When it is assumed that "$x_k(n)$" (k=1, 2, 3, . . . , N) represents each channel signal of the multi-channel audio signal and the downmix signal is generated as $$\text{“}\sum_{k=1}^{N} a_k \cdot x_k(n)\text{”},$$

the maximum value of the downmix gain may be determined to be $$\text{“}\sum_{k=1}^{N} a_k\text{”}.$$

For example, when $a_1=1$, $a_2=1$, $a_3=1$, $a_4=1/\sqrt{2}$, $a_5=1/\sqrt{2}$, and $a_6=1/\sqrt{10}$, the maximum value of the downmix gain may be determined to be 4.73. When the maximum value of the downmix gain is rounded down, it is determined to be 4.

Figure 8:
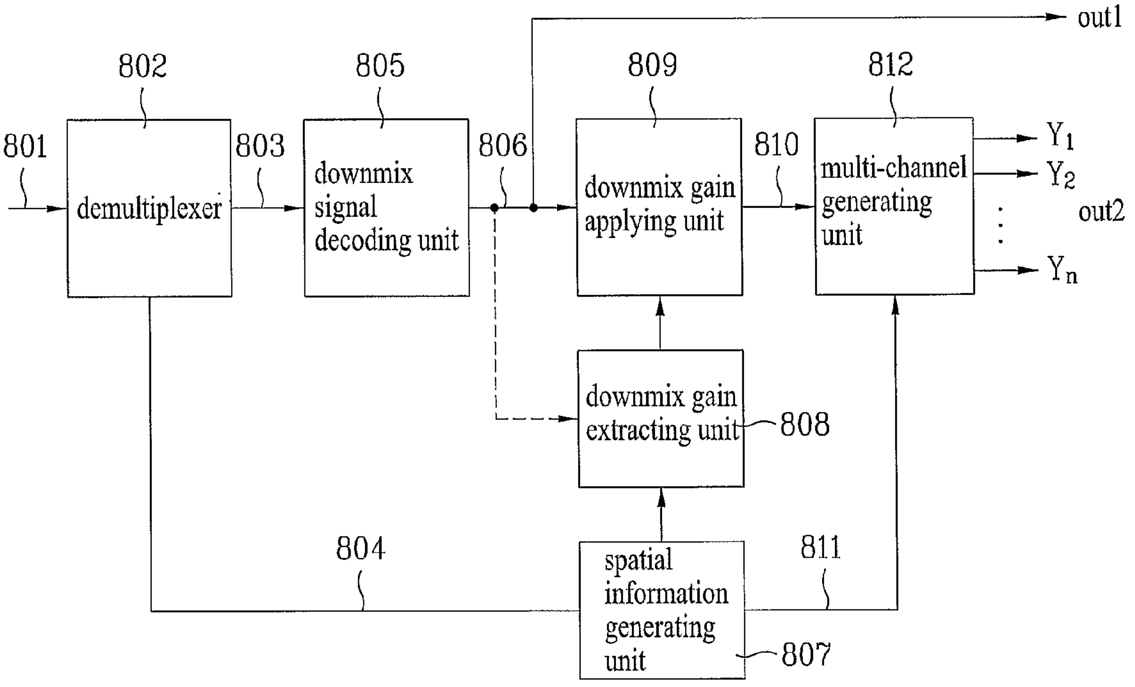
FIG. 8 is a block diagram illustrating a third decoding apparatus in which a downmix gain is applied to a downmix signal, for modification of the downmix signal, in accordance with an embodiment of the present invention.

FIG. 8 illustrates a third decoding apparatus in which a downmix gain is applied to a downmix signal, for modification of the downmix signal, in accordance with an embodiment of the present invention. The third decoding apparatus includes a demultiplexer 802, a downmix signal decoding unit 805, a spatial information signal decoding unit 807, a downmix gain extracting unit 808, a downmix gain applying unit 809, and a multi-channel generating unit 812.

Referring to FIG. 8, the third decoding apparatus is similar to the first decoding apparatus. The third decoding apparatus has a difference from the first decoding apparatus in terms of the downmix gain extracting unit 808.

Since the demultiplexer 802, downmix signal decoding unit 805, spatial information signal decoding unit 807, downmix gain applying unit 809, and multi-channel generating unit 812 are identical or similar to those of the first decoding apparatus described with reference to FIG. 4, no detailed description thereof will be given.

The downmix gain extracting unit 808 may extract downmix gain information from a decoded spatial information signal 804 or a decoded downmix signal 803.

Figure 9:
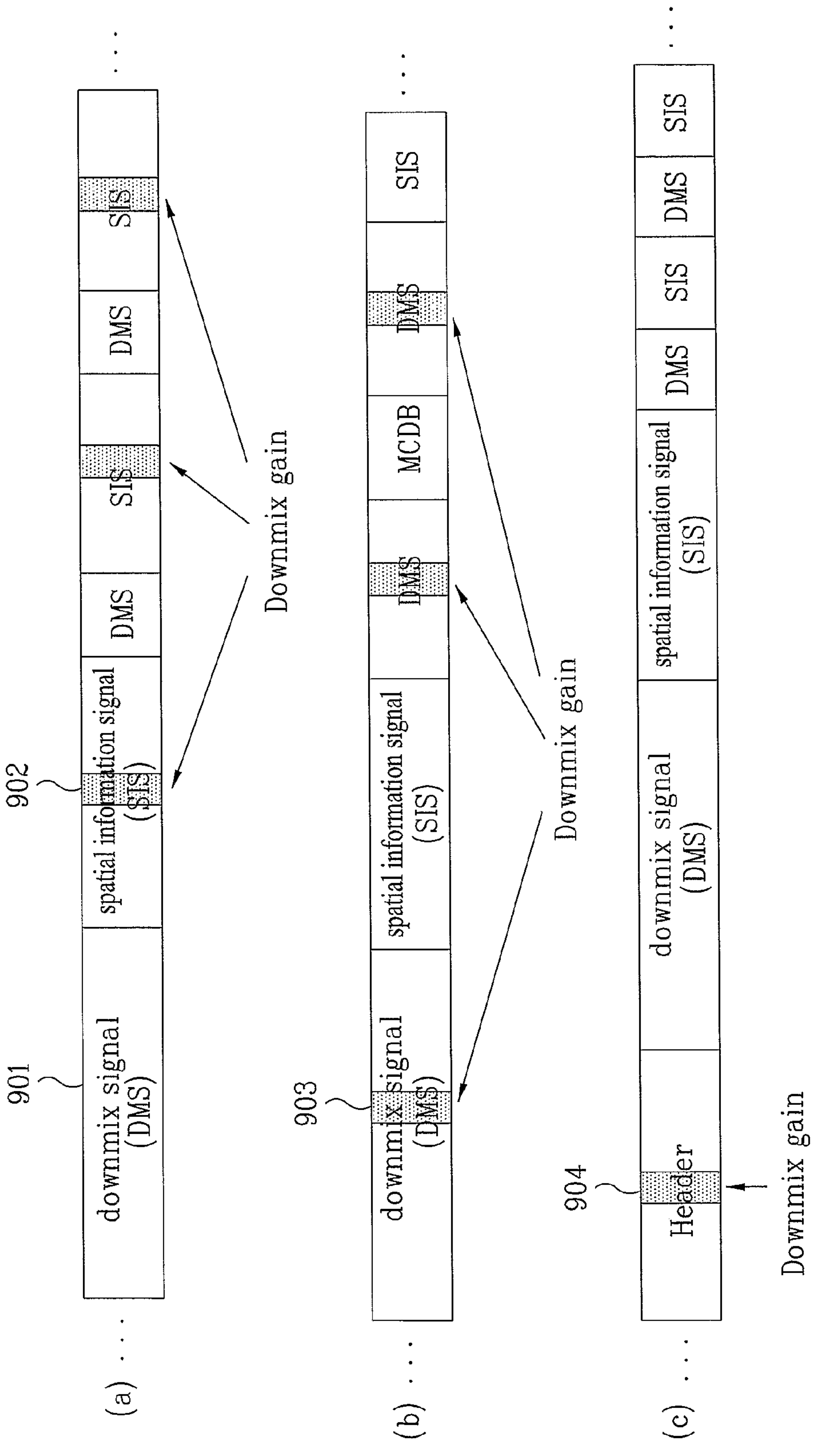
FIG. 9 is a diagram illustrating bitstreams containing downmix gain information according to embodiments of the present invention, respectively.

FIG. 9 illustrates bitstreams containing downmix gain information according to embodiments of the present invention, respectively. As shown in a drawing (a) of FIG. 9, downmix gain information may be inserted into a spatial information signal 902 of a bitstream per frame, in which the bitstream includes a downmix signal 901 and the spatial information signal 902.

As shown in a drawing (b) of FIG. 9, the downmix gain information may also be inserted into the downmix signal 903 of the bitstream per frame. Also, the downmix gain information may be inserted into the bitstream per a plurality of frames. The downmix gain may have a constant value for the overall frame of the bitstream, or may have a variable value per frame or per a plurality of frames.

In accordance with the present invention, a method may be implemented in which the spatial information signal has a header (or, configuration information area) per frame or per a plurality of frames, and the header contains downmix gain information. Where the spatial information signal has a header per frame, the decoding apparatus extracts downmix gain information from the header and applies a downmix gain to the frame. On the other hand, where the spatial information signal has a header per a plurality of frames, the decoding apparatus extracts downmix gain information from the frame having the header. Then, the decoding apparatus applies a downmix gain to the frame having the header and applies a downmix gain extracted from the previous header to the remaining frames having no header. The header may be periodically or non-periodically contained in frames of the spatial information signal.

As shown in a drawing (c) of FIG. 9, the downmix gain information may also be inserted into a header 904 of the bitstream. The header 904 includes configuration information, etc. In this case, the downmix gain information may be inserted into the header in the form of an independent value, or may be inserted into the header in the form of a grouped value after being grouped with other values such as a specific channel gain.

In accordance with the present invention, another method may be implemented in which the downmix gain information is inserted in a reserved field of the bitstream, without using an additional bit.

In addition, in accordance with the present invention, another method may be implemented in which combinations of the methods shown in drawings (a), (b) and (c) of FIG. 9 may be used. For example, the downmix gain may be inserted into the header, as shown in a drawing (c) of FIG. 9, and simultaneously may be inserted into the spatial information signal, as shown in a drawing (a) of FIG. 9. In addition, the downmix gain may be directly inserted in the bitstream, or may be selectively inserted in the bitstream in accordance with identification information as to whether or not the downmix gain should be used. For example, the header of the bitstream may have first identification information as to whether or not the downmix gain should be used. When it is determined, based on the first identification information, that the downmix gain should be used, each frame of the bitstream has second identification information as to whether or not the downmix gain should be used. When it is determined that the downmix gain should be used in a frame, the downmix gain is included in the frame.

FIGS. 10A and 10B illustrate various types of the downmix gain according to an embodiment of the present invention. The downmix gain may have various values. For example, as shown in FIGS. 10A and 10B, a table may be comprised of specific channel gains (for example, surround gains and LFE gains) and downmix gains. Referring to Table 1, "1/sqrt(2)" and "1/sqrt(10)" may be used for the surround gain and LFE gain, respectively. For the downmix gain, "1" or "½" may be used.

Referring to Table 2, "1/sqrt(2)" and "1/sqrt(10)" may be used for the surround gain and LFE gain, respectively. For the downmix gain, "1", "½", or "¼" may be used.

Referring to Table 3, "1/sqrt(2)" and "1/sqrt(10)" may be used for the surround gain and LFE gain, respectively. For the downmix gain, "1", "1/sqrt(2)", or "½" may be used.

Referring to Table 4, "1/sqrt(2)" and "1/sqrt(10)" may be used for the surround gain and LFE gain, respectively. For the downmix gain, "1", "1/sqrt(2)", "½", or "1/(2×sqrt(2)) may be used.

Referring to Table 5, "1/sqrt(2)" and "1/sqrt(10)" may be used for the surround gain and LFE gain, respectively. For the downmix gain, "1", "¾", "⅔" or "½" may be used.

Referring to Table 5, "1/sqrt(2)" and "1/sqrt(10)" may be used for the surround gain and LFE gain, respectively. For the downmix gain, "1", "¾", "2/4" or "¼" may be used.

Although the surround gain and LFE gain have been described in FIGS. 10A and 10B as being fixed to a specific value (for example, "1/sqrt(2)" and "1/sqrt(10)" respectively), the present invention is not limited thereto. In accordance with the present invention, the surround gain and LFE gain may be selected from a plurality of specific values, as in the downmix gain. In accordance with the present invention, specific channel gains other than the surround gain and LFE gain may be used.

Figure 11:
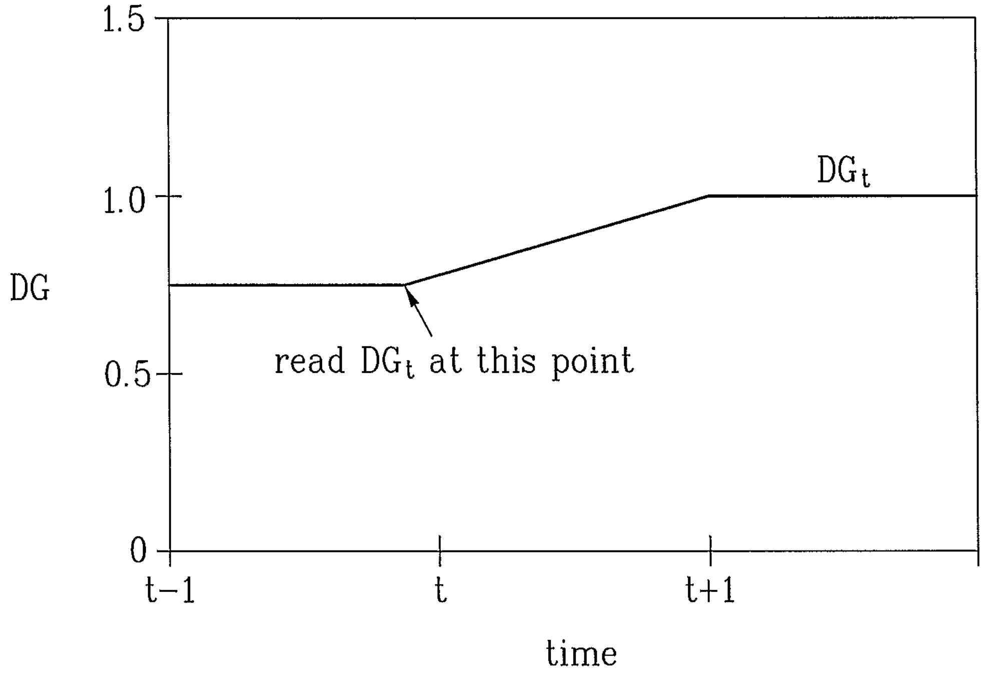
FIG. 11 is a graph illustrating a method for preventing a sound quality degradation around frames caused by application of a downmix gain in accordance with the present invention.

FIG. 11 illustrates a method for preventing a sound quality degradation around frames, in which the sound quality degradation is caused by application of a downmix gain in accordance with the present invention. When a variation in sound level occurs due to application of a downmix gain, the sound quality degradation may occur around a frame where the value of the downmix gain is varied abruptly. This is because an abrupt sound level variation occurs around the frame where the value of the downmix gain is varied abruptly. For this reason, it is necessary to set a transition period, in order to cause the effect resulting from a variation in downmix gain to be smoothly exhibited. In this regard, a smoothing process may be carried out using the following expression.

$$DG(n)=a(n)DG_{t-1}(n-1)+(1-a(n)DG_t(n),$$

where, n=0, 1, 2, . . . , N

In the above expression, "a(n)" may be a first-order linear function or a general n-order polynomial function. "a(n)" may also be a function exhibiting a smooth variation when a variation in downmix gain (DG) occurs, for example, a Gaussian function, a Hanning function, or a Hamming function.

Meanwhile, although the above-described smoothing process is carried out, an adverse effect resulting from an abrupt downmix gain variation may still remain. Accordingly, a restriction may be performed in an encoding procedure, to prevent an abrupt downmix gain variation. Of course, even when the encoding apparatus includes no configuration capable of preventing an abrupt downmix gain variation, an analysis for preventing the abrupt downmix gain variation may be performed in the decoding apparatus. For example, when downmix gains having incrementally or decrementally-varying values are used, it may be possible to prevent an abrupt downmix gain variation by controlling the downmix gain variation to be within one increment or decrement between successive frames, or to be one increment or decrement per a predetermined number of frames (n frames).

Figure 12:
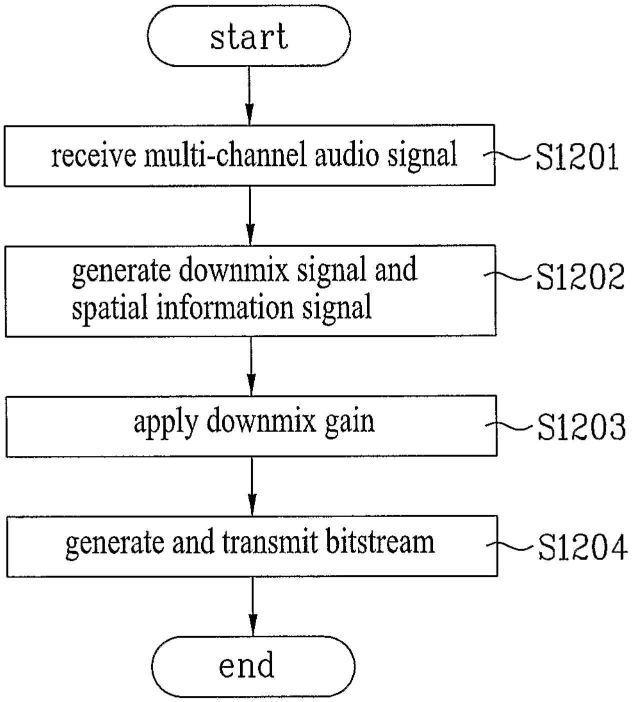
FIG. 12 is a flow chart illustrating an audio signal encoding method using application of a downmix gain to a downmix signal in accordance with an embodiment of the present invention.

FIG. 12 is a flow chart illustrating an audio signal encoding method using application of a downmix gain to a downmix signal in accordance with an embodiment of the present invention. Referring to FIG. 12, an encoding apparatus, in which the audio signal encoding method will be carried out, first receives a multi-channel audio signal (S1201). The multi-channel audio signal is then downmixed by a downmixing unit of the encoding apparatus which, in turn, generates a downmix signal (S1202). Although the downmix signal is obtained in accordance with downmixing of the multi-channel audio signal, as described above, a downmix signal directly input from the external of the encoding apparatus, for example, an arbitrary downmix signal, may used. A spatial information signal is generated from the multi-channel audio signal by a spatial information generating unit of the encoding apparatus (S1202).

Thereafter, a downmix gain is applied to the downmix signal by a downmix gain applying unit of the encoding apparatus (S1203). For example, when the downmix gain is larger than 1, the downmix signal is multiplied by the reciprocal of the downmix gain, to reduce the sound level of the downmix signal. On the other hand, when the downmix gain is smaller than 1, the downmix signal is multiplied by the downmix gain, to reduce the sound level of the downmix signal.

A bitstream including the downmix gain-applied downmix signal and spatial information signal is then generated by a multiplier of the encoding apparatus (S1204). The generated bitstream may be transmitted to a decoding apparatus (S1204).

The downmix gain may be applied to all frames of the downmix signal of the bitstream. Although this method is preferable for the downmix signal frames having a large sound level, a drawback occurs when the method is applied to the downmix signal frames having a small sound level because a degradation in signal-to-noise ratio (SNR) may occur. Accordingly, different downmix gain values may be used at intervals of a predetermined time.

A downmix gain application syntax may be defined per frame in the bitstream. In this case, a downmix gain is selectively applicable per frame in accordance with the downmix gain application syntax. For example, application of a downmix gain to a downmix signal can be executed as follows.

First, a downmix gain is set in the header of the bitstream. In this case, the downmix gain may be applied to the overall frames of the downmix signal influenced by the header.

Second, an independent downmix gain is applied to the downmix signal per frame in accordance with a separately-defined syntax.

Third, a combination of the first and second methods is used. That is, a downmix gain to be applied to all frames of the downmix signal (hereinafter, referred to as a "first downmix gain") is set. The first downmix gain is used for the overall period or for a long period ranging, for example, from 1 to 2 seconds. Separately from the first downmix gain, another downmix gain (hereinafter, referred to as a "second downmix gain") is applied to the downmix signal per frame, in order to enable a gain control for a period not covered by the first downmix gain.

Decoding of a downmix signal, to which a downmix gain has been applied, as described above, can be directly carried out without taking into consideration the downmix gain applied to the downmix signal, when the decoded downmix signal is reproduced in the form of a mono or stereo signal. However, when a downmix signal is decoded to be reproduced in the form of a multi-channel audio signal, the following methods may be used.

The first method is to apply a downmix gain to the overall range of the downmix signal or to range of the downmix signal, to which a header is applied, in order to recover the sound level of an associated audio signal.

The second method is to apply a downmix gain to the downmix signal per frame or to a plurality of frames of the downmix signal shorter than the range to which the header is applied.

The third method is to use a combination of the first and second methods. That is, a downmix gain is applied to the downmix signal per frame or per a plurality of frames, and another downmix gain is then applied to the overall range of the downmix signal.

Figure 13:
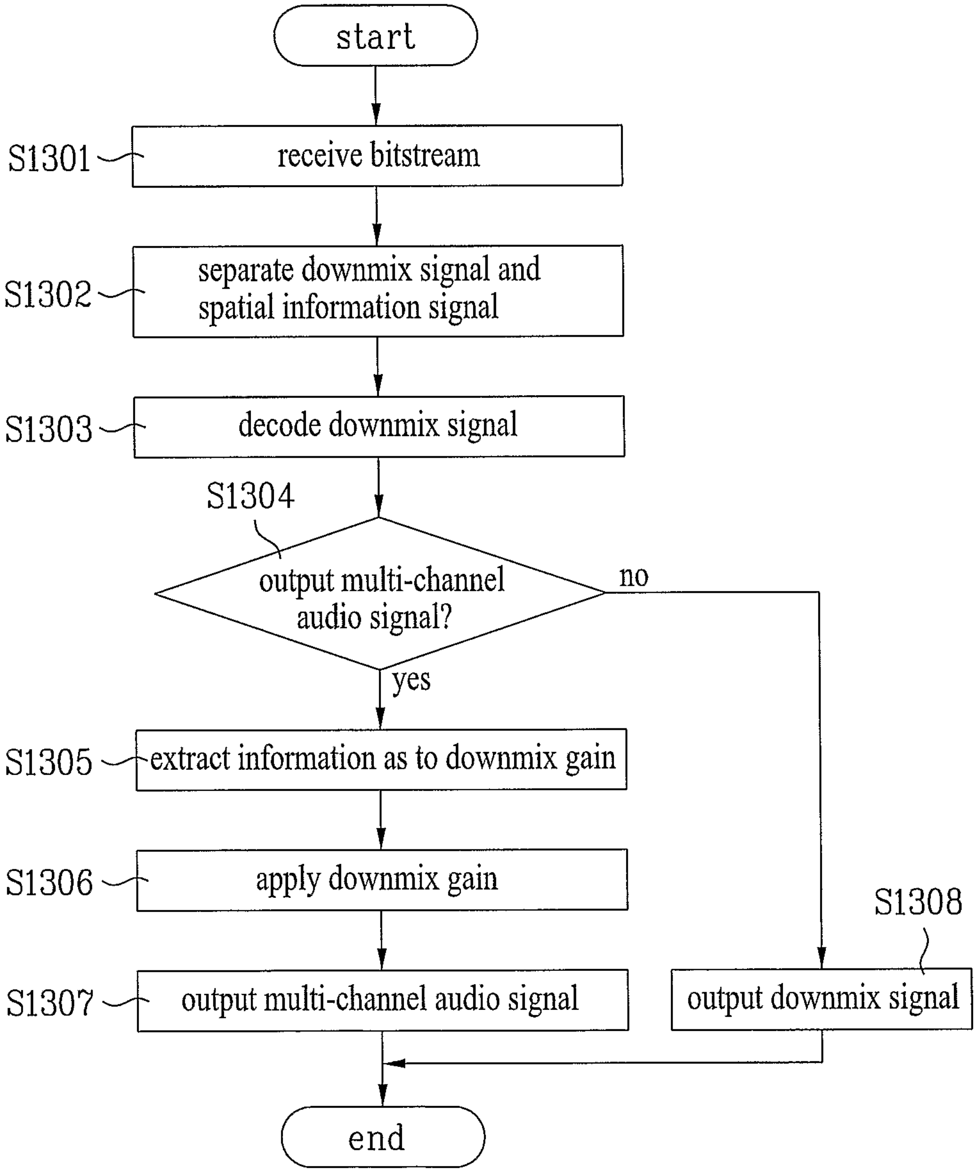
FIG. 13 is a flow chart illustrating an audio signal decoding method in which a downmix gain is applied to a downmix signal in accordance with an embodiment of the present invention.

FIG. 13 is a flow chart illustrating an audio signal decoding method in which a downmix gain is applied to a downmix signal in accordance with an embodiment of the present invention. Referring to FIG. 13, a decoding apparatus, to which the audio signal decoding method is applied, receives a bitstream of an audio signal (S1301). The bitstream includes an encoded downmix signal and an encoded spatial information signal.

A demultiplexer of the decoding apparatus separates the encoded downmix signal and encoded spatial information signal from the received bitstream (S1302). A downmix signal decoding unit of the decoding apparatus decodes the encoded downmix signal and outputs a decoded downmix signal (S1303).

When the decoding apparatus cannot output a multi-channel audio signal using the spatial information (S1304), the decoding apparatus may directly output the downmix signal decoded by the downmix signal decoding unit (S1308). On the other hand, when the decoding apparatus can output a multi-channel audio signal (S1304), the following procedure is executed.

That is, a spatial information signal decoding unit of the decoding apparatus decodes the separated spatial information signal and generates spatial information. A downmix gain extracting unit of the decoding apparatus extracts downmix gain information from the spatial information signal or downmix signal (S1305). A downmix gain may be determined, based on the extracted downmix gain information. A downmix gain applying unit of the decoding apparatus applies the determined downmix gain to the downmix signal (S1306). A multi-channel generating unit of the decoding apparatus transforms the downmix gain-applied downmix signal to a multi-channel audio signal by using the spatial information (S1307).

Figure 14:
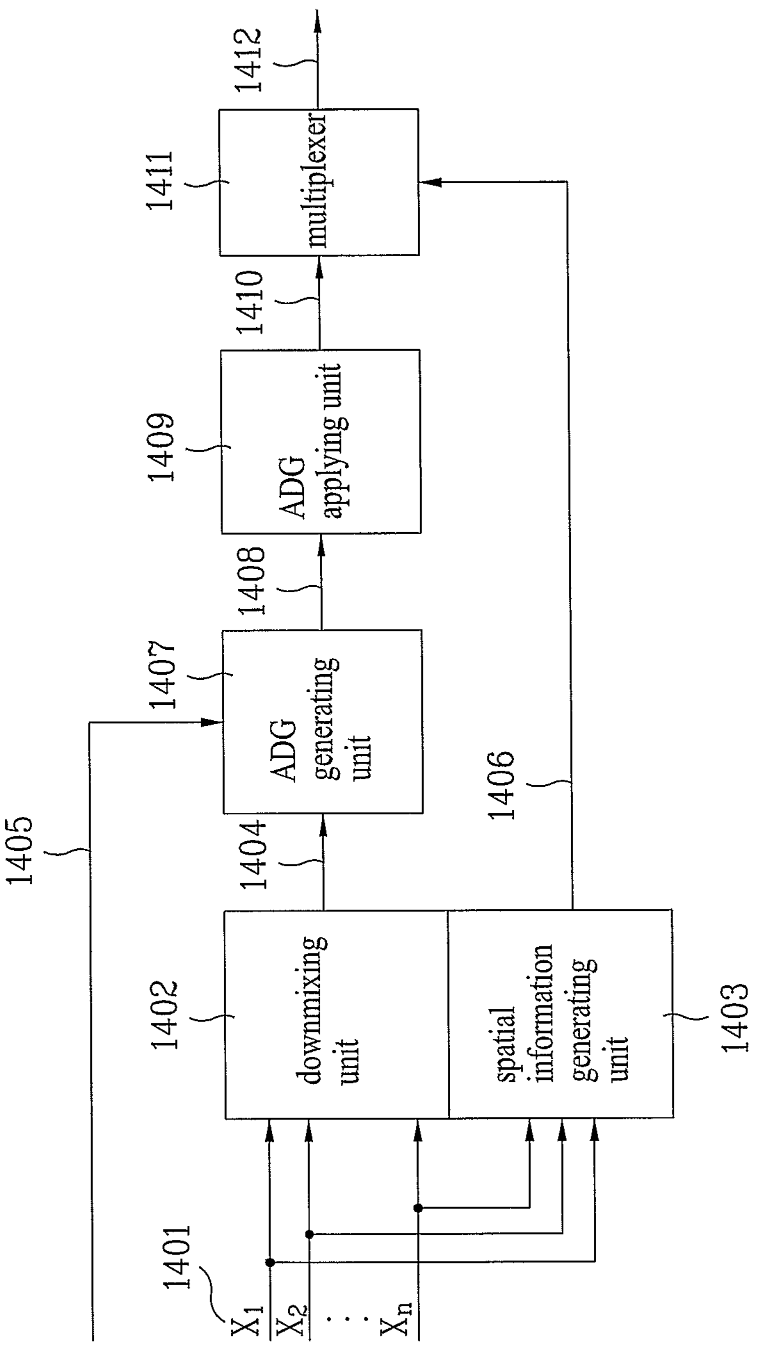
FIG. 14 is a block diagram illustrating an encoding apparatus in which an arbitrary downmix gain (ADG) is applied to a downmix signal, for modification of the downmix signal, in accordance with an embodiment of the present invention.

FIG. 14 illustrates an encoding apparatus in which an arbitrary downmix gain (ADG) is applied to a downmix signal, for modification of the downmix signal, in accordance with an embodiment of the present invention. The encoding apparatus includes a downmixing unit 1402, a spatial information generating unit 1403, an ADG generating unit 1407, an ADG applying unit 1409, and a multiplexer 1411.

Referring to FIG. 14, the downmixing unit 1402 downmixes a multi-channel audio signal 1401, thereby generating a downmix signal 1404. In FIG. 14, "n" means the number of input channels. The spatial information generating unit 1403 extracts spatial information from the multi-channel audio signal 1401.

The ADG generating unit 1407 may compare the downmix signal 1404 generated by the downmixing unit 1402 (hereinafter, referred to as a "first downmix signal") with a downmix signal 1405 directly input from the external of the encoding apparatus (hereinafter, referred to as a "second downmix signal"), to determine an ADG. For example, an ADG may be generated, based on information representing a difference between the first and second downmix signals 1404 and 1405, namely, difference information. Here, "ADG" means information for reducing the difference of the second downmix signal from the first downmix signal, In the present invention, "ADG" may also be applied to the second downmix signal or to the first downmix signal, in order to modify the downmix signal.

The ADG applying unit 1409 applies the ADG generated by the ADG generating unit 1407 to a downmix signal 1408. When the downmix signal 1408 is the second downmix signal 1405, the ADG is used not only to reduce the difference of the second downmix signal 1405 from the first downmix signal 1404, but also to modify the downmix signal 1408, for example, for a reduction in the sound level of the downmix signal 1408. In this case, the application of the ADG to the downmix signal 1408 may be executed per frame.

The multiplexer 1411 generates a bitstream 1412 including the ADG-applied downmix signal 1408, to which the ADG has been applied, and a spatial information signal 1406. The spatial information signal 1406 is constituted by the spatial information extracted by the spatial information generating unit 1403. The bitstream 1412 is transmitted to a decoding apparatus. The bitstream 1412 may also contain information as to the ADG.

Figure 15:
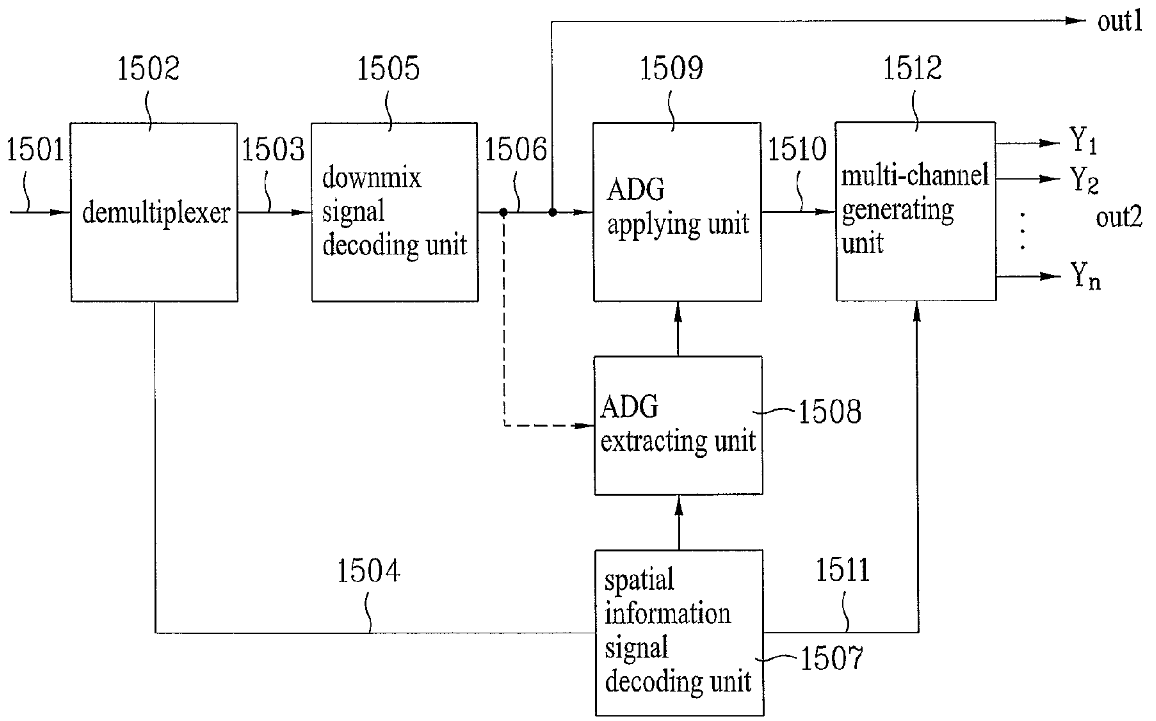
FIG. 15 is a block diagram illustrating a decoding apparatus in which an ADG is applied to a downmix signal, for modification of the downmix signal, in accordance with an embodiment of the present invention.

FIG. 15 illustrates a decoding apparatus in which an ADG is applied to a downmix signal, for modification of the downmix signal, in accordance with an embodiment of the present invention. The decoding apparatus includes a demultiplexer 1502, a downmix signal decoding unit 1505, a spatial information signal decoding unit 1507, an ADG extracting unit 1508, an ADG applying unit 1509, and a multi-channel generating unit 1512.

Referring to FIG. 15, the demultiplexer 1502 separates an encoded downmix signal 1503 and an encoded spatial information signal 1504 from a bitstream 1501.

The downmix signal decoding unit 1505 decodes the encoded downmix signal 1503, and outputs the resulting decoded signal as a downmix signal 1506 which may be a mono, stereo, or multi-channel audio signal. The downmix signal decoding unit 1505 may use a core codec decoder. When the decoding apparatus cannot process the downmix signal 1506 to output a multi-channel audio signal, the downmix signal 1506 may be directly output from the decoding apparatus (out1).

The spatial information signal decoding unit 1507 decodes the encoded spatial information signal 1504, and outputs the resulting decoded signal as spatial information 1511.

The ADG extracting unit 1508 extracts information as to an ADG, namely, ADG information, from the spatial information signal 1504. The ADG extracting unit 1508 may also extract the ADG information from the downmix signal 1506.

The ADG applying unit 1509 applies an ADG to the downmix signal 1506, in which the ADG is determined based on the ADG information extracted by the ADG extracting unit 1508. The multi-channel generating unit 1512 transforms the ADG-applied downmix signal 1510 to a multi-channel audio signal, using the spatial information 1508, and outputs the multi-channel audio signal (out2).

Figure 16:
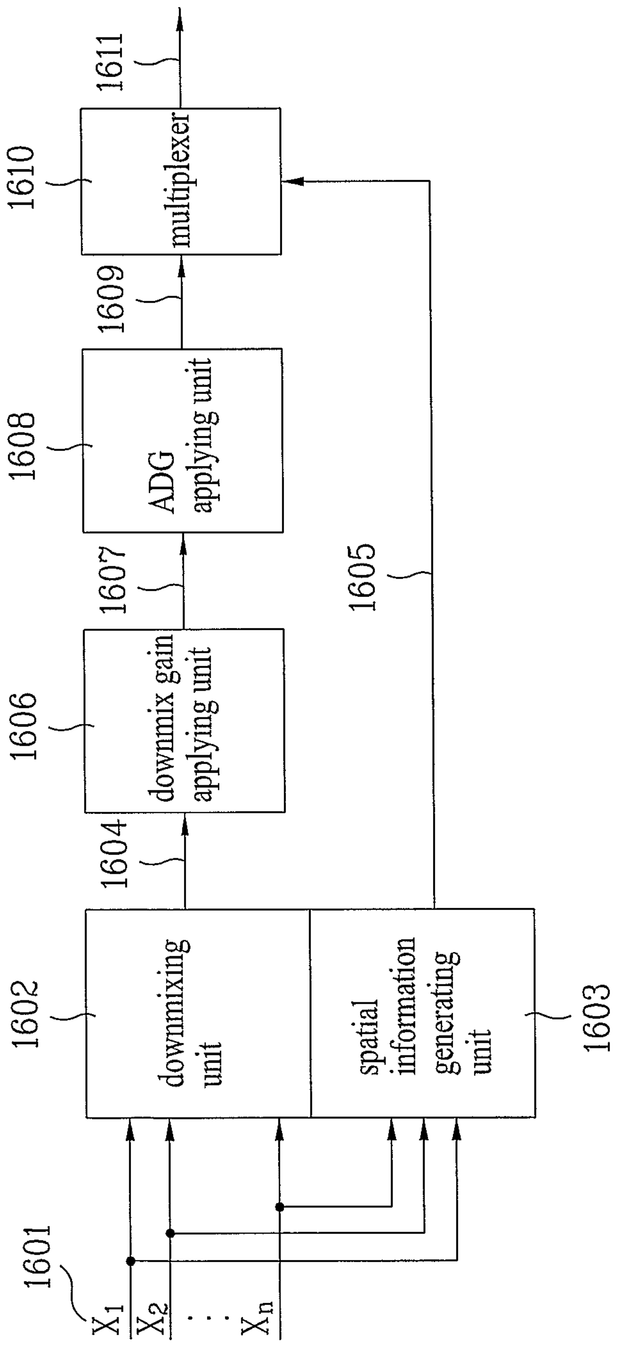
FIG. 16 is a block diagram illustrating an encoding apparatus in which a downmix gain and an ADG are applied to a downmix signal, for modification of the downmix signal, in accordance with an embodiment of the present invention.

FIG. 16 illustrates an encoding apparatus in which a downmix gain and an ADG are applied to a downmix signal, for modification of the downmix signal, in accordance with an embodiment of the present invention. The encoding apparatus includes a downmixing unit 1602, a spatial information generating unit 1603, a downmix gain applying unit 1606, an ADG applying unit 1608, and a multiplexer 1610.

Referring to FIG. 16, since the downmixing unit 1602, the spatial information generating unit 1603 and the multiplexer 1610 are identical or similar to those of FIG. 14, no detailed description thereof will be given.

The encoding apparatus of FIG. 16 has a difference from the encoding apparatus of FIG. 14 in that the encoding apparatus of FIG. 16 includes both the downmix gain applying unit 1606 and the ADG applying unit 1608, in order to implement application of both the downmix gain and the ADG. Although not shown in FIG. 16, the encoding apparatus of FIG. 16 may also include a downmix gain generating unit and an ADG generating unit.

In detail, the downmix gain applying unit 1606 applies a downmix gain to a downmix signal 1604. The downmix gain may be uniformly applied to the overall range of the downmix signal 1604. Also, the application of the downmix gain may be executed during a procedure for downmixing a multi-channel audio signal 1601 in the downmixing unit 1602, and thus, generating a downmix signal 1604.

The ADG applying unit 1608 applies an ADG to the downmix signal 1607, to which the downmix gain has been applied. As described above, the application of the ADG to the downmix signal 1607 may be executed on per frame. In accordance with the application of the ADG, the waveform of the ADG-applied downmix signal may have an effect similar to an effect exhibited when dynamic range control (DRC) is applied. The ADG may be applied to the downmix signal in a frequency domain, more specifically, in a hybrid domain. In accordance with the present invention, application of the downmix gain and ADG to a downmix signal (not shown) input from the external of the encoding apparatus is also possible.

The multiplexer 1610 generates a bitstream 1611 including the downmix signal 1609, to which the ADG has been applied, and a spatial information signal 1605.

Figure 17:
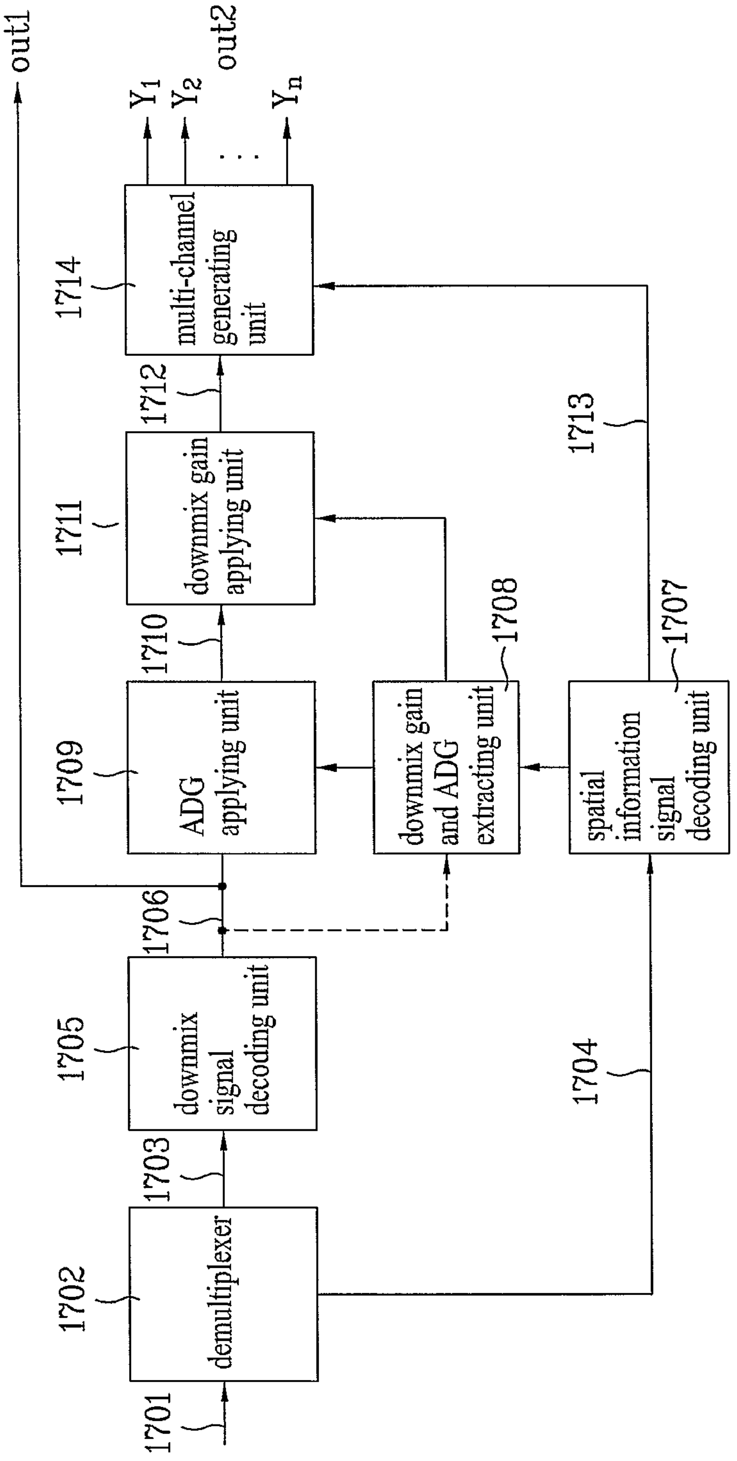
FIG. 17 is a block diagram illustrating a decoding apparatus in which a downmix gain and an ADG are applied to a downmix signal, for modification of the downmix signal, in accordance with an embodiment of the present invention.

FIG. 17 illustrates a decoding apparatus in which a downmix gain and an ADG are applied to a downmix signal, for modification of the downmix signal, in accordance with an embodiment of the present invention. The decoding apparatus includes a demultiplexer 1702, a downmix signal decoding unit 1705, a spatial information signal decoding unit 1707, a downmix gain and ADG extracting unit 1708, an ADG applying unit 1709, a downmix gain applying unit 1711, and a multi-channel generating unit 1714.

Referring to FIG. 17, the demultiplexer 1702, downmix signal decoding unit 1705, spatial information signal decoding unit 1707, and multi-channel generating unit 1714 have functions identical or similar to those of the demultiplexer 1502, downmix signal decoding unit 1505, spatial information signal decoding unit 1507, and multi-channel generating unit 1512 shown in FIG. 15. Accordingly, no detailed description of these constituent elements will be given.

The decoding apparatus of FIG. 17 has a difference from the decoding apparatus of FIG. 15 in that the decoding apparatus of FIG. 17 includes the downmix gain and ADG extracting unit 1708, ADG applying unit 1709, and downmix gain applying unit 1711, in order to implement application of both the downmix gain and the ADG.

The downmix gain and ADG extracting unit 1708 extracts downmix gain and ADG information from a spatial information signal 1704. The downmix gain and ADG information may be extracted by the same constituent element. Alternatively, the downmix gain and ADG information may be extracted by the separate constituent elements (not shown), respectively. Also, the downmix gain and ADG information may be extracted from a downmix signal 1706.

The ADG applying unit 1709 applies an ADG generated in accordance with the extracted ADG information to the downmix signal 1706 generated in accordance with a decoding operation of the downmix signal decoding unit 1705. As described above, application of the ADG to the downmix signal 1706 may be executed per frame.

The downmix gain applying unit 1711 applies the downmix gain generated in accordance with the downmix gain information to a downmix signal 1710, to which the ADG has been applied. The multi-channel generating unit 1714 outputs a downmix signal 1712, to which the ADG and downmix gain have been applied, as a multi-channel audio signal, using spatial information 1713 (out2). When the decoding apparatus cannot output such a multi-channel audio signal, it may directly output the downmix signal 1706 generated in accordance with the decoding operation of the downmix signal decoding unit 1705 (out1).

FIG. 18 illustrates a plurality of frequency bands to which an ADG is applied in accordance with an embodiment of the present invention. In an application of an ADG to frequency bands of an audio signal, the ADG may have the same value as the channel level difference (CLD) of the audio signal. For example, the ADG may have the same number of parameter bands as the CLD. Accordingly, when application of an ADG is implemented in a decoding apparatus, it is possible to determine the number of groups into which the overall frequency band should be divided, based on a value of "bsFreqResStridexxx", as shown in FIG. 18.

When "pbStride" is 1, no grouping of the overall frequency band is executed. In this case, reading of an ADG is executed for each frequency band, and the read ADG is applied to the frequency band. When "pbStride" is 5, reading of an ADG is executed for every 5 frequency bands, and the read ADG is applied to the 5 frequency bands. On the other hand, when "pbStride" is 28, reading of an ADG is executed, and the read ADG is applied to the overall frequency band. Thus, when "pbStride" is 28, overall-band gain control is executed, whereas when "pbStride" has a value other than 28, multi-band gain control is executed.

The ADG-based gain control may also be executed for each channel of the downmix signal.

Also, the ADG application may be executed on a time slot basis. Here, "time slot" means a time interval by which an audio signal is equally divided in time domain. Accordingly, when an abrupt variation in sound level toward loud sound occurs at a specific time position, it is possible to execute a gain control for the loud sound at the specific time position. When a variation in ADG value occurs, a primary interpolation is executed for the ADG. Otherwise, the ADG value is maintained. Thus, in the case of overall-band gain control, one ADG per time slot exists for the overall frequency band. On the other hand, in the case of multi-band gain control, one ADG per time slot exists for multi-frequency band.

Figure 19:
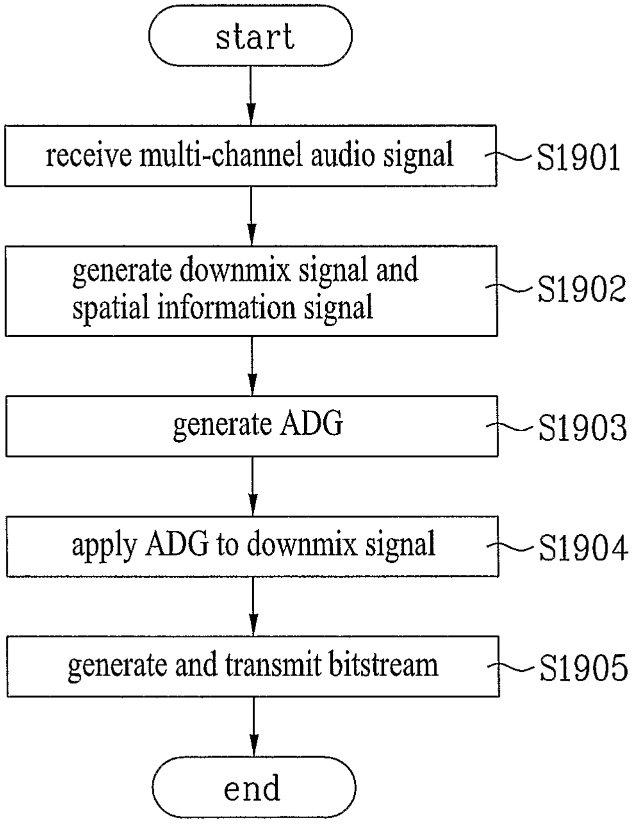
FIG. 19 is a flow chart illustrating an audio signal encoding method in which an ADG is applied to a downmix signal, for modification of the downmix signal, in accordance with an embodiment of the present invention.

FIG. 19 is a flow chart illustrating an audio signal encoding method in which an ADG is applied to a downmix signal, for modification of the downmix signal, in accordance with an embodiment of the present invention. An encoding apparatus, in which the audio signal encoding method will be carried out, first receives a multi-channel audio signal (S1901).

The multi-channel audio signal is then downmixed by a downmixing unit of the encoding apparatus which, in turn, generates a first downmix signal (S1902).

A spatial information signal is generated from the multi-channel audio signal by a spatial information generating unit of the encoding apparatus (S1902).

Thereafter, the first downmix signal is compared with a downmix signal directly input from the external of the encoding apparatus, namely, a second downmix signal, by an ADG generating unit of the encoding apparatus. Based on the result of the comparison, the ADG generating unit generates an ADG (S1903). The generated ADG is then applied to the first downmix signal or second downmix signal in an ADG applying unit of the encoding apparatus (S1904). Subsequently, a bitstream including the ADG-applied downmix signal and spatial information signal is generated by a multiplexer of the encoding apparatus (S1905). The generated bitstream is transmitted to a decoding apparatus (S1905).

In accordance with the present invention, another audio signal encoding method may be implemented in which both a downmix gain and an ADG are applied to a downmix signal, for modification of the downmix signal. This encoding method is similar to the encoding method shown in FIG. 19. This encoding method has a difference from the encoding method shown in FIG. 19 in that the method further includes application of a downmix gain to the downmix signal, after the generation of the downmix signal and spatial information signal as shown in FIG. 19. In this encoding method, an ADG may then be applied to the downmix signal to which the downmix gain has been applied.

In accordance with the present invention, the generation of the ADG is carried out in such a manner that the low frequency portion of the ADG is not generated as a gain, but generated by executing residual coding for the low frequency component of the first downmix signal, and the high frequency portion of the ADG is generated as a gain, as in a conventional method, in order to enable the generated ADG to exhibit an improved performance. Here, "residual coding" means directly coding a part of a downmix signal.

In the above-described method, the low frequency portion of the ADG is generated by executing residual coding directly for the low frequency component of the first downmix signal. However, the low frequency portion of the ADG may be generated by executing residual coding for the difference between the first and second downmix signal.

The ADG generated as a gain and the ADG generated in accordance with residual coding of the low frequency component of the first downmix signal are applied to a downmix signal, in order to modify the downmix signal. In accordance with the present invention, recovery information associated with a point where sound level loss of a downmix signal is generated may be added to an ADG, or may be transmitted along with the ADG, in order to enable the ADG with the recovery information to be used for modification of the downmix signal in a decoding apparatus.

In accordance with the present invention, information for modifying a downmix signal (for example, varying the amplitude of the downmix signal) and information for recovering a second downmix signal to reduce a difference between the second downmix signal and a first downmix signal may also be included in an ADG. The ADG generated in the above-described manner may be transmitted in a state of being included in a spatial information signal.

Figure 20:
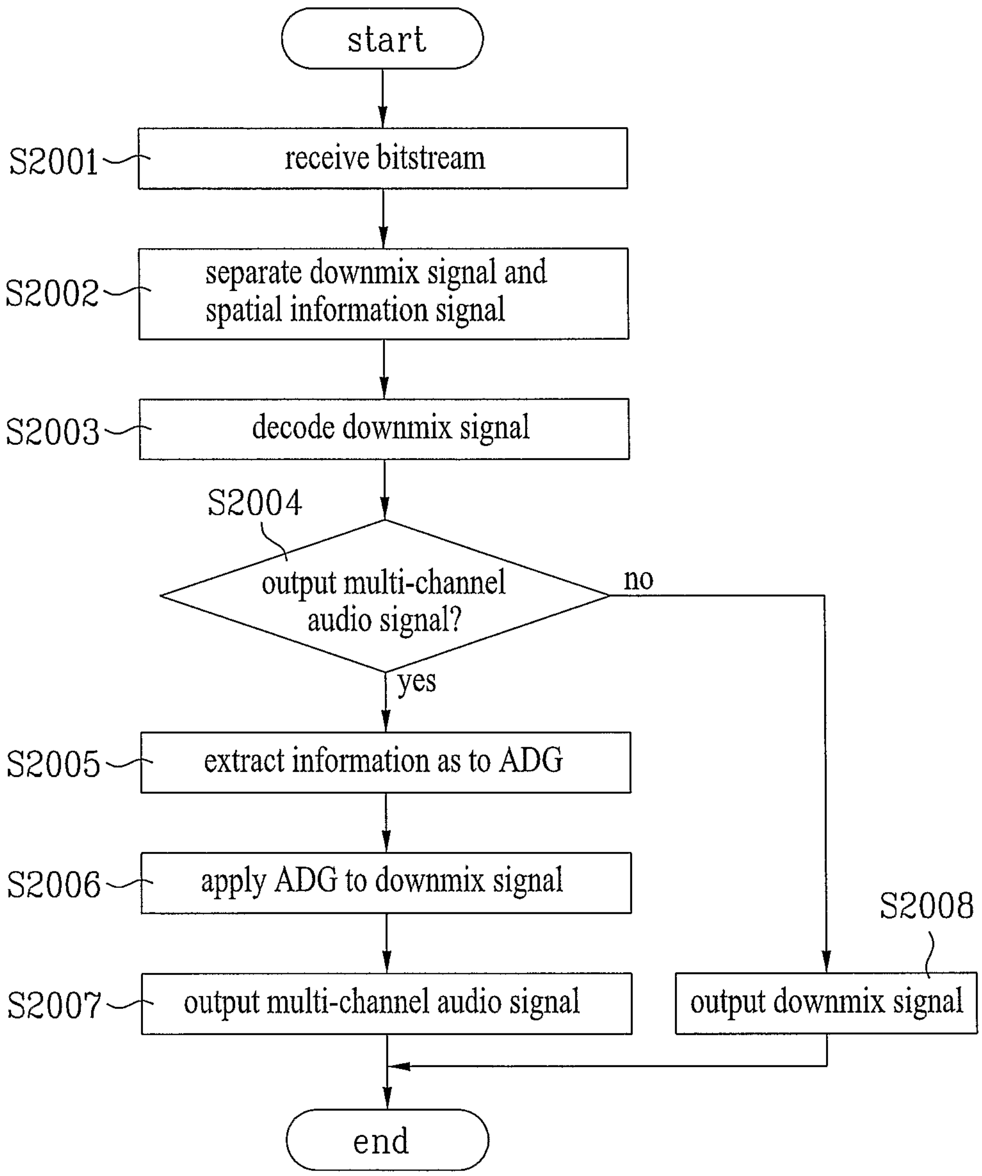
FIG. 20 is a flow chart illustrating an audio signal decoding method in which an ADG is applied to a downmix signal, for modification of the downmix signal, in accordance with an embodiment of the present invention.

FIG. 20 is a flow chart illustrating an audio signal decoding method in which an ADG is applied to a downmix signal, for modification of the downmix signal, in accordance with an embodiment of the present invention. Referring to FIG. 20, a decoding apparatus, to which the audio signal decoding method is applied, receives a bitstream of an audio signal (S2001). The bitstream includes an encoded downmix signal and an encoded spatial information signal.

The encoded downmix signal and encoded spatial information signal are separated from the received bitstream by a demultiplexer of the decoding apparatus (S2002). The separated downmix signal is decoded by a downmix signal decoding unit of the decoding apparatus (S2003).

When the decoding apparatus cannot output the downmix signal as a multi-channel audio signal, using the spatial information (S2004), the decoding apparatus may directly output the downmix signal decoded by the downmix signal decoding unit (S2008). On the other hand, when the decoding apparatus can output the downmix signal as a multi-channel audio signal (S2004), the following procedure is executed.

That is, the separated spatial information signal is decoded by a spatial information signal decoding unit of the decoding apparatus, so that spatial information is generated. ADG information is also extracted from the spatial information signal or downmix signal by an ADG extracting unit of the decoding apparatus (S2005). An ADG may be determined, based on the extracted ADG information. The determined ADG is applied to the downmix signal by an ADG applying unit of the decoding apparatus (S2006). The ADG-applied downmix signal is transformed to a multi-channel audio signal by a multi-channel generating unit of the decoding apparatus, based on the spatial information, and the multi-channel audio signal is output from the decoding apparatus (S2007).

In accordance with the present invention, another decoding method may be also implemented in which a downmix gain and an ADG are applied to a downmix signal, for modification of the downmix signal. This decoding method is similar to the decoding method shown in FIG. 20. This decoding method has a difference from the decoding method shown in FIG. 20 in that the method further includes application of a downmix gain to the downmix signal, prior to the application of the ADG to the downmix signal (S2006). Hereinafter, this decoding method will be described in more detail.

Downmix gain information and ADG information are extracted from a spatial information signal or a downmix signal by a downmix gain and ADG extracting unit (not shown). A downmix gain, which is generated based on the extracted downmix gain information, is then applied to the downmix signal. The downmix gain may be applied to the overall range of the downmix signal. Thereafter, an ADG, which is generated based on the extracted ADG information, is applied to the downmix signal. The application of the ADG to the downmix signal may be executed per frame.

Figure 21:
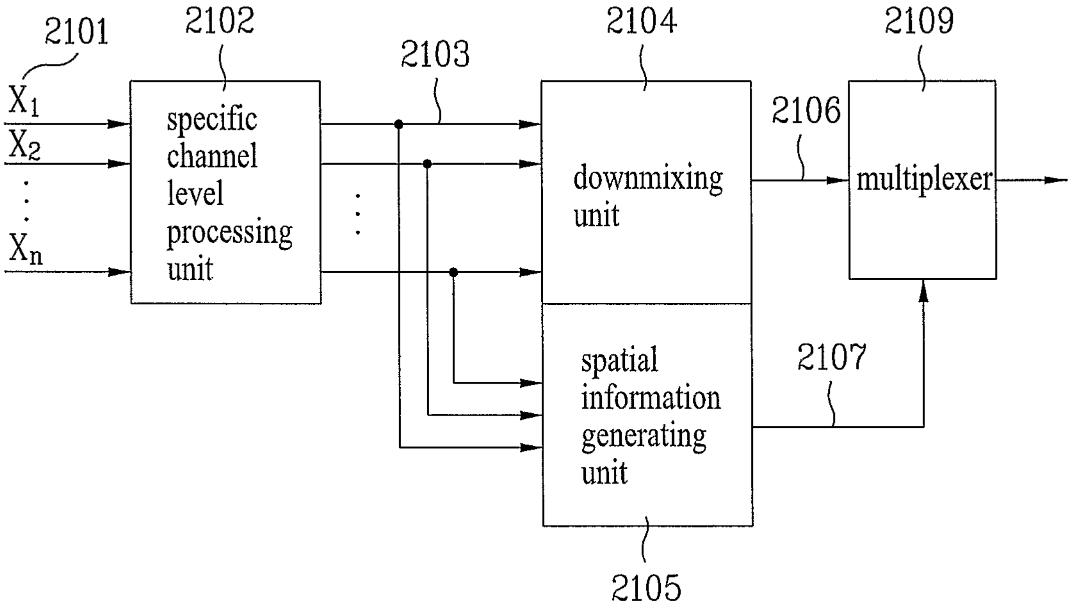
FIG. 21 is a block diagram illustrating an encoding apparatus for modifying a sound level of a specific channel in accordance with an embodiment of the present invention.

FIG. 21 is a block diagram illustrating an encoding apparatus for modifying a energy level of a specific channel in accordance with an embodiment of the present invention. The encoding apparatus includes a specific channel level processing unit 2102, a downmixing unit 2104, a spatial information generating unit 2105, and a multiplexer 2108.

Referring to FIG. 21, the specific channel level processing unit 2102 receives a multi-channel audio signal 2101, modifies the energy level of a specific channel of the received multi-channel audio signal 2101, and outputs the modified multi-channel audio signal 2103. Here, "energy level" means a value proportional to the amplitude of an associated signal, and includes sound level. Whether and how the energy level of a specific channel has been varied can be determined through a measurement or a calculation. It is preferred that the energy level modification be made by applying a specific channel gain to a channel signal in which a variation in energy level has occurred. For example, the energy level modification may be made by applying a surround gain or LFE gain to a surround channel or LFE channel. The downmixing unit 2014 downmixes the energy level-modified multi-channel audio signal 2103, thereby generating a downmix signal 2106. Also, the spatial information generating unit 2105 extracts spatial information from the multi-channel audio signal 2103.

The multiplexer 2108 generates a bitstream 2109 including the downmix signal 2106 and a spatial information signal 2107. The spatial information signal 2107 is constituted by spatial information extracted by the spatial information generating unit 2105. The bitstream 2109 is transmitted to a decoding apparatus. The bitstream 2109 may also contain specific channel gain information.

Figure 22:
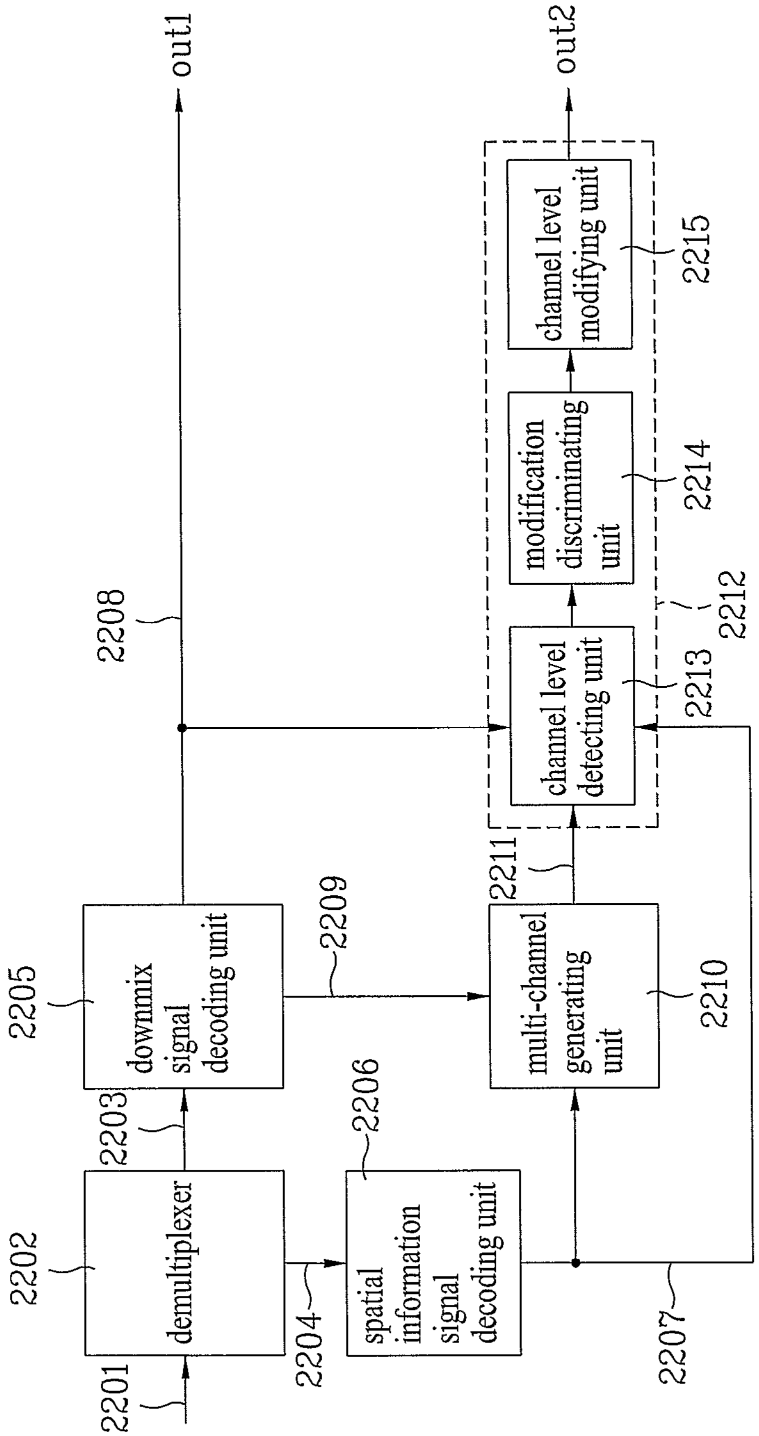
FIG. 22 is a block diagram illustrating an decoding apparatus for modifying a sound level of a specific channel in accordance with an embodiment of the present invention.

FIG. 22 is a block diagram illustrating an decoding apparatus for modifying a energy level of a specific channel in accordance with an embodiment of the present invention. The decoding apparatus includes a demultiplexer 2202, a downmix signal decoding unit 2205, a spatial information signal decoding unit 2206, a multi-channel generating unit 2210, and a specific channel level processing unit 2212.

Referring to FIG. 22, the demultiplexer 2202 receives a bitstream 2201 of an audio signal, and separates an encoded downmix signal 2203 and an encoded spatial information signal 2204 from the bitstream 2201.

The downmix signal decoding unit 2205 decodes the encoded downmix signal 2203, and outputs the resulting decoded downmix signal 2208. The downmix signal decoding unit 2205 may also generate a downmix signal 2209 having a pulse-code modulation (PCM) data format by decoding the encoded downmix signal 2203.

The spatial information signal decoding unit 2206 decodes the spatial information signal 2204, and outputs the resulting spatial information 2207. The multi-channel generating unit 2210 transforms the downmix signal 2209 to a multi-channel audio signal 2211.

The specific channel level processing unit 2212 receives the multi-channel audio signal 2211, spatial information 2207, and downmix signal 2208, and performs energy level modification per channel, based on the received signals.

The specific channel level processing unit 2212 includes a channel level detecting unit 2213, a modification discriminating unit 2214, and a channel level modifying unit 2215. The channel level detecting unit 2213 detects whether and how the channel energy level of the multi-channel audio signal 2211 has been varied per channel. The modification discriminating unit 2214 discriminates whether or not a energy level modification should be executed per channel, based on the result of the detection executed in the channel level detecting unit 2213. The channel level modifying unit 2215 modifies the energy level of a specific channel, based on the result of the discrimination executed in the modification discriminating unit 2214.

When the decoding apparatus cannot output a multi-channel audio signal, the decoding apparatus may directly output the downmix signal 2008 generated in accordance with the decoding operation of the downmix signal decoding unit 2005 (out1). On the other hand, when the decoding apparatus can output a multi-channel audio signal, the decoding apparatus may output the multi-channel audio signal after modifying the energy level of the multi-channel audio signal per channel (out2).

The decoding apparatus shown in FIG. 22 can modify the level of a specific channel by itself when there is no level modification information as to the specific channel sent from an encoding apparatus. This decoding apparatus has a feature in that the specific channel level processing unit 2212 is configured independently of the multi-channel generating unit 2210. The channel level detecting unit 2213 included in the specific channel level processing unit 2212 can calculate the energy level of the original audio signal, based on the CLD contained in the spatial information and the downmix signal 2218. The calculated energy level is compared with the energy level of the multi-channel audio signal 2211 inputted from the multi-channel generating unit 2210.

When it is determined, based on the result of the comparison, that there is a level difference, a energy level modification is carried out in the channel level modifying unit 2215. That is, the channel level modifying unit 2215 multiplies the energy level of the multi-channel audio signal 2211 by a predetermined specific channel gain, to modify the energy level of the multi-channel audio signal 2211. In this case, the modification discriminating unit 2214 may determine that it is necessary to execute the channel level modification, when there is an energy level difference. Alternatively, the modification discriminating unit 2214 may determine that it is necessary to execute the channel level modification, only when there is an energy level difference exceeding a predetermined limit.

In accordance with the present invention, another decoding apparatus may be implemented which is similar to the decoding apparatus shown in FIG. 22, but different from the decoding apparatus shown in FIG. 22 in that the channel level detecting unit and modification discriminating unit are included in the multi-channel generating unit, and the channel level modifying unit is independently configured.

In accordance with the present invention, another decoding apparatus may be implemented which is similar to the decoding apparatus shown in FIG. 22, but different from the decoding apparatus shown in FIG. 22 in that the channel level detecting unit, modification discriminating unit, and channel level modifying unit are included in the multi-channel generating unit. In this case, it is possible to perform an energy level modification per channel, using an internal function in the multi-channel generating unit. The energy level modification method, which uses an internal function, may include a method for adjusting gains of filters such as quadrature mirror filters (QMFs) or hybrid filters when such filters are used, a method for adjusting the overall gain, a method for adjusting a pre-matrix or post-matrix value, a method for adjusting a function associated with a subband envelope application tool or a time envelope application tool, a method for adjusting gains of a decorrelated signal and an original signal when the signals are summed, or a method which uses a specific module, in place of the above-described methods. Where decoding is achieved using QMF or hybrid filters, it is possible to analyze the frequency band characteristics of each channel. Where decoding is achieved using a subband envelope application tool or a time envelope application tool, it is possible to enable the user to generate a final signal providing realist effects.

Figure 23:
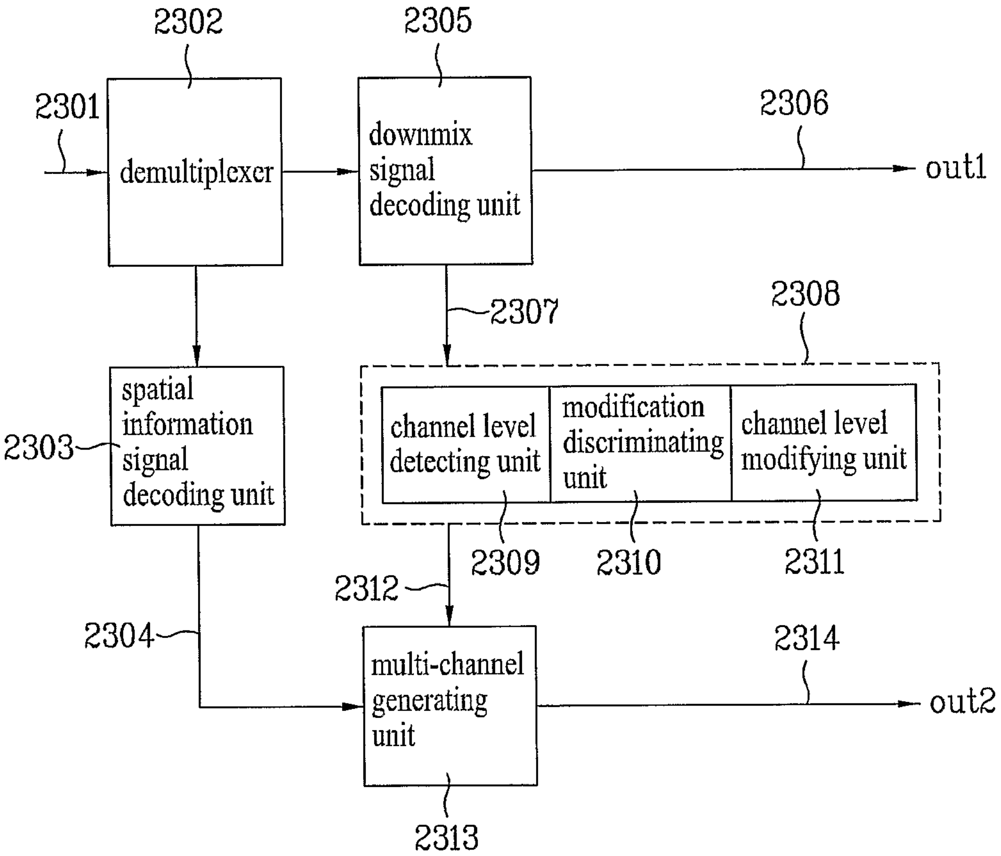
FIG. 23 is a block diagram illustrating a decoding apparatus for modifying a sound level of a specific channel in accordance with an embodiment of the present invention.

FIG. 23 is a block diagram illustrating a decoding apparatus for modifying a level of a specific channel in accordance with an embodiment of the present invention. This decoding apparatus has a configuration similar to that of the decoding apparatus shown in FIG. 22. Accordingly, no detailed description will be given of the similar configuration including a demultiplexer 2302, a downmix signal decoding unit 2305, and a spatial information signal decoding unit 2303. The decoding apparatus of FIG. 23 is different from the decoding apparatus of FIG. 22 in that the position of a specific channel level processing unit 2308 is different from that of the decoding apparatus shown in FIG. 22.

Referring to FIG. 23, the specific channel level processing unit 2308 includes a channel level detecting unit 2309, a modification discriminating unit 2310, and a channel level modifying unit 2311. The specific channel level processing unit 2308 can modify the energy level of the downmix signal 2307, which has a PCM data format, per channel.

In detail, when it is assumed that it is possible to detect an energy level difference between original signal and reproduced signal in accordance with a comparison between the energy levels of the original signal and reproduced signal, the channel level modifying unit 2311 modifies the energy level of the downmix signal 2307 on a channel basis.

The specific channel level processing unit 2308 transmits a downmix signal 2312 to a multi-channel generating unit 2313. The multi-channel generating unit 2313 can output the downmix signal 2312 as a multi-channel audio signal 2314 after processing the downmix signal 2312 using a spatial information signal 2304, in which the spatial information is generated in accordance with a decoding operation of the spatial information signal decoding unit 2303 for a spatial information signal (out2).

Meanwhile, in accordance with the present invention, modification of the energy level of a specific channel using a bitstream of an associated audio signal may be implemented. In detail, when an encoding apparatus modifies the energy level of a specific channel, and transmits information as to the modification in a state in which the modification information is contained in a bitstream, a decoding apparatus, which receives the bitstream, can extract the modification information from the bitstream, and can recover the energy level of the specific channel, based on the extracted modification information. For example, the encoding apparatus sets surround gains having various values, applies a selected one of the surround gains to a surround channel, and contains information as to the applied surround gain, namely, surround gain information, in a bitstream. In this case, the surround gain information may be contained in a spatial information signal of the bitstream. The decoding apparatus extracts the surround gain information from the bitstream. Using the extracted information, the decoding apparatus can recover the energy level of the surround channel to an original energy level. Hereinafter, a method for inserting modification information into a bitstream will be described in detail.

First, a spatial information signal is formatted such that it has a header per frame or per a plurality of frames. Modification information as to a specific channel (for example, surround gain information) is contained in the header. Where the spatial information signal has a header per a plurality of frames, the header may be periodically or non-periodically contained in the spatial information signal per a plurality of frames.

The bitstream may also contain bit information representing "which channel should be amplified or attenuated, and how the channel should be amplified or attenuated (dB)". In this case, the bitstream may contain information as to whether or not the energy level of a specific channel should be modified, and whether or not the previous data should be continuously used when the modification is executed. The bitstream may also contain information as to which channel should be modified. In addition, the bitstream may contain information as to the attenuation or amplification level (dB) of the channel to be modified.

In accordance with the present invention, a method may be implemented in which specific channels are grouped such that adjustment of specific channel gains is executed per group. That is, different channel-gains are applied to different groups of specific channels, respectively, in an encoding apparatus. After a downmixing operation, the encoding apparatus transmits the specific channel gain information in a state in which the specific channel gain information is contained in a bitstream generated in accordance with the downmixing operation. A decoding apparatus recovers the energy level of the multi-channel audio signal to an original energy level by applying the reciprocals of the channel-gains used in the encoding apparatus to the multi-channel audio signal per group.

For example, the channels of an audio signal may be grouped into three groups, namely, a first group consisting of a center channel, a front left channel, and a front right channel, a second group consisting of a rear left channel and a rear right channel, and a third group consisting of an LFE channel. In this case, a first specific channel gain adjustment method may be used in which application of a specific channel gain to each channel is executed per group, and the resulting channels are summed to generate a mono downmix signal. In the decoding apparatus, the mono downmix signal is transformed to multiple channels, and each of the multiple channels is multiplied by an associated specific channel gain per group so that it is outputted after being recovered to an original level. The specific channel gain multiplication may be executed after or during the transformation process.

A second specific channel gain adjustment method may also be used. In accordance with the second method, a specific channel gain is applied to each channel per group. Thereafter, the front left channel and rear left channel are summed to generate a left channel, and the front right channel and rear right channel are summed to generate a right channel. A specific channel gain is applied to each of the center channel and LFE channel which is, in turn, multiplied by $\frac{1}{2}\hat{}(\frac{1}{2})$. The resulting channels are added to the left channel and right channel, respectively, to generate a stereo downmix signal. When the stereo downmix signal generated as described above is decoded to generate a final signal, specific channel gain application is executed per channel. In particular, signals extracted from the left channel and right channel of the downmix signal is multiplied by $2\hat{}(\frac{1}{2})$, and added to the center channel and LFE channel. Although the embodiment associated with a mono or stereo downmix signal has been described, the present invention is not limited thereto.

In accordance with the present invention, another method may be implemented in which a downmix signal is generated after application of a specific channel gain to each channel per group, and application of a downmix gain is executed for the generated downmix signal.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

As apparent from the above description, in accordance with the present invention, it is possible to effectively prevent sound level loss of a multi-channel audio signal by applying a downmix gain to a downmix signal generated in accordance with downmixing of the multi-channel audio signal, or by downmixing the multi-channel audio signal, after applying a downmix gain to the multi-channel audio signal.

The sound level loss problem of the multi-channel audio signal can also be prevented by applying an ADG to a downmix signal generated in accordance with downmixing of the multi-channel audio signal, or by executing the application of the ADG to the downmix signal after the application of a downmix gain to the downmix signal.

In addition, the sound level loss problem of the multi-channel audio signal can be prevented by modifying the energy levels of specific channels of the multi-channel audio signal, and downmixing the modified multi-channel audio signal, to generate a downmix signal.

What is claimed is:

1. A method for decoding an audio signal, the method comprising:

receiving spatial information and a downmix signal from the audio signal, the downmix signal including a plurality of frames;

extracting a downmix gain and a low frequency enhancement (LFE) gain from the spatial information;

modifying an energy level of the frames in the downmix signal by using the downmix gain;

generating a multi-channel audio signal by applying the spatial information to the modified downmix signal, the multi-channel audio signal including a low frequency enhancement (LFE) channel signal; and modifying the multi-channel audio signal by applying the LFE gain to the LFE channel signal, wherein the downmix gain is applied to the downmix signal before the LFE gain is applied to the LFE channel signal.

2. The method according to claim 1, wherein the energy level is modified in a time domain.

3. The method according to claim 1, wherein the spatial information is applied in a frequency domain.

4. The method according to claim 1, wherein the downmix gain is extracted from a header of the spatial information.

5. A method for encoding an audio signal, the method comprising:

receiving a multi-channel audio signal having at least a low frequency enhancement (LFE) channel signal;

generating a downmix signal having a plurality of frames from a multi-channel audio signal;

generating a low frequency enhancement (LFE) gain being usable to modify an energy level of the LFE channel signal of the multi-channel audio signal;

generating spatial parameters from the multi-channel audio signal, for upmixing the downmix signal;

determining a downmix gain based on the downmix signal; and modifying an energy level of frames in the downmix signal by using the downmix wherein the LFE gain is applied to the LFE channel signal before the downmix gain is applied to the downmix signal.

6. An apparatus for decoding an audio signal, comprising:

a demultiplexer configured to separate a downmix signal and a spatial information from a bitstream of the audio signal, the downmix signal including a plurality of frames, the spatial information including a downmix gain, and a low frequency enhancement (LFE) gain;

a downmix gain applying unit configured to modify an energy level of the frames in the downmix signal by using the downmix gain; and a multi-channel generating unit configured to generate a multi-channel audio signal by applying the spatial information to the modified downmix signal, the multi-channel audio signal including a low frequency enhancement (LFE) channel signal; and a channel level modifying unit configured to generate a modified multi-channel audio signal by applying the LFE gain to the LFE channel signal, wherein the downmix gain is applied to the downmix signal before the LFE gain is applied to the LFE channel signal.

7. The apparatus according to claim 5, wherein the downmix gain applying unit modifies the energy level in a time domain.

8. The apparatus according to claim 5, wherein the spatial information is applied in a frequency domain.

9. The apparatus according to claim 5, wherein the downmix gain is contained in a header of the spatial information.

10. An apparatus for encoding an audio signal, comprising:

a downmixing unit configured to receive a multi-channel audio signal having at least a low frequency enhancement (LFE) channel signal and to generate a downmix signal having a plurality of frames from the multi-channel audio signal;

a spatial parameter generating unit configured to generate spatial parameters, for upmixing the downmix signal from the multi-channel audio signal, and to generate a low frequency enhancement (LFE) gain being usable to modify an energy level of the LFE channel signal of the multi-channel audio signal;

a downmix gain determining unit configured to determine a downmix gain based on the downmix signal; and a downmix gain applying unit configured to modify an energy level of the frames in the downmix signal by using the downmix gain wherein the LFE gain is applied to the LFE channel signal before the downmix gain is applied to the downmix signal.

* * * * *

UNITED STATES PATENT AND TRADEMARK OFFICE

CERTIFICATE OF CORRECTION

PATENT NO. : 8,494,667 B2
APPLICATION NO. : 11/994315
DATED : July 23, 2013
INVENTOR(S) : Hee-Suk Pang et al.

It is certified that error appears in the above-identified patent and that said Letters Patent is hereby corrected as shown below:

ON THE TITLE PAGE:

Item (30), Foreign Application Priority Data, change:

"Jun. 24, 2006 (KR) ..................... 10-2006-0058142"

to: --Jun. 27, 2006 (KR) ..................... 10-2006-0058142--.

Signed and Sealed this
Twenty-sixth Day of November, 2013

Margaret A. Focarino

*Commissioner for Patents of the United States Patent and Trademark Office*